United States Patent
Celikel

(10) Patent No.: US 9,857,176 B2
(45) Date of Patent: Jan. 2, 2018

(54) DYNAMICALLY MONITORING THE INSTANTANEOUS ZERO ROTATION RATE VOLTAGE OF INTERFEROMETRIC FIBER OPTIC GYROSCOPE (IFOG)

(71) Applicant: TUBITAK (TURKIYE BILIMSEL VE TEKNOLOJIK ARASTIRMA KURUMU), Ankara (TR)

(72) Inventor: Oguz Celikel, Kocaeli (TR)

(73) Assignee: TUBITAK (TURKIYE BILIMSEL VE TEKNOLOJIK ARASTIRMA KURUMU), Ankara (TR)

( * ) Notice: Subject to any disclaimer, the term of this patent is extended or adjusted under 35 U.S.C. 154(b) by 123 days.

(21) Appl. No.: 14/900,171

(22) PCT Filed: Jun. 20, 2013

(86) PCT No.: PCT/IB2013/055059
§ 371 (c)(1),
(2) Date: Dec. 20, 2015

(87) PCT Pub. No.: WO2014/203040
PCT Pub. Date: Dec. 24, 2014

(65) Prior Publication Data
US 2016/0146607 A1    May 26, 2016

(51) Int. Cl.
G01C 19/72    (2006.01)
(52) U.S. Cl.
CPC ......... *G01C 19/722* (2013.01); *G01C 19/725* (2013.01)
(58) Field of Classification Search
CPC .................................................. G01C 19/728
See application file for complete search history.

(56) References Cited

U.S. PATENT DOCUMENTS 5,157,461 A * 10/1992 Page .............. G01C 19/72
356/462
2016/0291135 A1* 10/2016 Ando ............... G01S 17/58

FOREIGN PATENT DOCUMENTS

EP    0141331 A2    5/1985

OTHER PUBLICATIONS

Loukianov D, Rodloff R, Sorg H, Stieler B: "Optical Gyros and their Application", The Research and Technology Organization (RTO) of NATO printed by Candy Communication Group Inc., Section 5,4, 1999.

(Continued)

*Primary Examiner* — Shawn Decenzo
(74) *Attorney, Agent, or Firm* — Gokalp Bayramoglu

(57) ABSTRACT

The drift (°/h) for an interferometric fiber optic gyroscope (IFOG) means the variations on the voltage generated versus the zero angular (rotation) rate, while IFOG is not under influence of any angular rate effect. If the drift of an IFOG is predefined, the compensation of the drift can trivially be carried out by a subtraction process. However, with this invention, the necessity of the predefinition of the zero rotation rate voltage of the IFOG which belongs to the primary coil called "Gyro Coil" herein, is removed because the instantaneous variations on the zero rotation rate voltage of the IFOG can be monitored either periodically or whenever required with help of a secondary coil, called as "Monitor Coil", which is able to be switched by a microcontroller controlled-MEMS fiber optic ON/OFF switches. The new configuration of IFOG, to be referred as Dynamical Drift Monitoring-Interferometric Fiber Optic Gyroscope (DDM-IFOG) and the new method presented and implemented in this invention are valid for IFOG having open-loop and closed-loop schemes by engaging the voltage of zeroing the total phase (Feedback Phase Ø plus Sagnac Phase Shift) in the sensing coil instead of directly using the (Continued)

voltage of the demodulation circuit induced by the Sagnac Phase Shift (SPS).

14 Claims, 10 Drawing Sheets

(56) References Cited

OTHER PUBLICATIONS

Bergh R A, Culshaw B, Cutler C C, Lefevre H C, and Shaw H J: "Source statistics and the Kerr effect in fiber-optic gyroscopes", Optics Letters, vol. 7 No. 11, 563-565, 1982.

H Lefevre, 1993, The Fiber-Optic Gyroscope, Artech House, Boston and London, Chapters 5, 6 and 7.

Celikel O and San S E; "Establishment of All Digital Closed-Loop Interferometric Fiber-Optic Gyroscope and Scale Factor Comparison for Open-Loop and All Digital Closed-Loop Configurations", IEEE Sensors Journal, vol. 9 No.2, 176-186, 2009.

Moeller, R. P., Burns, W. K, and Frigo, N J: "Open-loop output and scale factor stability in a fiber optic gyroscope", Journal of Lightwave Technology, vol. 7, No.2, 262-269, 1989.

Celikel O and Sametoglu F: "Assessment of magneto-optic Faraday effect-based drift on interferometric single-mode fiber optic gyroscope (IFOG) as a function of variable degree of polarization (DOP)", Measurement Science & Technology, 23, 025104, (17pp), 2012.

Celikel O, Sametoglu F, and Sozeri H: "Optoelectronic Design Parameters of Interferometric Fiber Optic Gyroscope with LiNbO3 having North Finder Capability, and Earth Rotation Rate Measurement", Indian Journal of Pure & Applied Physics, vol. 48, 375-384, 2010.

Celikel O: "Application of the vector modulation method to the north finder capability gyroscope as a directional sensor", Measurement Science & Technology, projected angular 22, 035203, (12pp), 2011.

Celikel O: "Construction and characterization of interferometric fiber optic gyroscope (IFOG) with erbium doped fiber amplifier (EDFA)", Optical and Quamtum Electronics, 39, 147-156, 2007.

* cited by examiner

DYNAMICALLY MONITORING THE INSTANTANEOUS ZERO ROTATION RATE VOLTAGE OF INTERFEROMETRIC FIBER OPTIC GYROSCOPE (IFOG)

FIELD

The present invention is related to instantaneous monitoring and deriving the zero rotation rate voltage of the demodulation circuit of the IFOG having the "Gyro Coil", which corresponds to drift, and is directly defined as drift (°/h), under the influence of continuous rotation around z-axis (yaw) by using the "Monitor Coil" oriented perpendicularly to the rotation axis of the "Gyro Coil" together with MEMS FO ON/OFF switches adapted to the IFOG configuration.

BACKGROUND

A moving object is represented as a vector, which has an orientation and a magnitude. In order to reach exact information about the location of the moving object in a three-dimensional space at any time it is necessary to know three-dimensional vector representation of the object with respect to a reference point. When the magnitude of the relevant vector component in any axis corresponds to the acceleration of the moving object in that axis, its orientation information is obtained from the angular rate information collected by gyroscopes, which have a scale factor in terms of (°/s)/mV, based on Sagnac Effect, along with precise clock determining a time interval $\Delta t$ and the voltage difference from the zero rotation voltage within $\Delta t$. As a result the orientation of any rotating frame, on which a gyroscope is mounted, is tracked by integrating the voltage differences produced from the rotation rate signal in three dimensional (x, y, z) in $\Delta t$. The angular orientation error of the rotating frame is primarily determined by inherently unpredictable optical drift which is resulted from nonlinearities of optical fiber used as sensing coil of an IFOG, which is a ring interferometer, and environmental influences such as magnetic field, and the temperature and acoustic gradients on the sensing coil caused by thermal transients, which causes the growth of angular orientation error proportional to time due to the integration process.

The first ring interferometer and the first experiment relating to light propagation in a rotation media were performed by F. Harress [1]. His experimental setup was composed of light source, readout optics, and series of rotating prisms forming a circular optical path. However, Harress couldn't have observed the effect of the rotation on the travelling light, which he had expected, due to the fact that the light source and detection system located at the middle of his setup were not undergoing rotation applied by Harress. The first successful experiment of the ring interferometer configured to observe the rotation effect proposed by G. Sagnac in 1913, which states that an optical path difference is experienced by light beams propagating along opposite directions in a rotating frame, was carried out by A. A. Michelson and H. G. Gale with a gigantic Michelson interferometer configuration in 1925. The measurement of this optical path difference is proportional to absolute rotation rate and this is a basis for all types of the optical gyroscopes. For two continuous light waves propagating in opposite directions of the media of gyroscope, SPS is a function of absolute rotation rate, (°/h). With development of optical fiber manufacturing technology, a fiber ring interferometer with multiple optical paths was first constructed by V. Vali and R. W. Shorthill in 1976 to show SPS and this fiber ring interferometer configuration is known as a pioneering step in the applications of optical fiber gyroscope.

SPS $\varphi_R$, which is a function of the rotation rate (angular rate) of a fiber ring interferometer with respect to an inertial frame, is only induced by rotation, not linear acceleration. $\varphi_R$ for a fiber ring interferometer having N turn optical path is given in the following;

$$\varphi_R = \frac{8\pi N}{\lambda_0 c_0} A \cdot \Omega \ (°) \tag{1}$$

Where both A and $\Omega$ are vector quantities. A is the area of the enclosed optical path, $\Omega$ is the rotation rate of the two beam interferometer, $\lambda_0$ and $c_0$ is wavelength and light velocity in vacuum. Sagnac Effect in matter is more delicate to explain, but it is completely independent of the indices of refraction or of the guidance condition, and keeps the same value as that in the vacuum. If the optical path in the gyroscope configuration consists of N turns, i.e., optical fiber, SPS ($\emptyset_R$) is given as in Eq.(1) [1]. The fiber ring interferometer, now to be called as Interferometric Fiber Optic Gyroscope (IFOG) herein, has a cosine response in Eq.(2).

$$I = \eta P_0 (1 + \cos \emptyset_R) \ (A) \tag{2}$$

Where I is total photodiode current defining the interferometer response in A, $\eta$ is the spectral responsivity of the photodiode in A/W, and $P_0$ is optical power falling onto photodiode in W. It is very hard to observe and extract the SPS from Eq.(2) in DC signal methods. For extracting SPS and enhancing the signal to noise ratio, a reciprocal phase modulation is applied to optical path in which the counter propagating light waves at clockwise (CW) and counter clockwise (CCW) by periodically modulating sine and square waves, the amplitudes and the angular frequencies of which hold the ring interferometer's sensitivity at $\pm\pi/2$ rad.

$$I = \eta P_0 (1 + \cos(\emptyset_R + \Delta\emptyset_m(t))) \ (A) \tag{3}$$

Sine-reciprocal phase modulation $\Delta\emptyset_m(t)$ for propagation of CW and CCW lightwaves inside the optical fiber of the sensing coil, in which the travelling time of light is $\tau_g$ for a light velocity in vacuum, is, $$\Delta\emptyset_m(t) = \emptyset_{cw} - \emptyset_{ccw} = \emptyset_{b0} \sin \omega_m t \tag{4}$$

$$\Delta\emptyset_m(t) = \alpha \cdot V_{mod}^{p-p} \cdot \{\sin \omega_m t - \sin \omega_m (t - \tau_g)\} = \emptyset_{cw} - \emptyset_{ccw} \tag{5}$$

There is a retardation of $\tau_g$ between the arms of the sensing coil to which the phase modulation is applied and not applied. By using the trigonometric identities Eq.(6) is obtained.

$$\Delta\emptyset_m(t) = 2\emptyset_{b0} \sin\frac{\omega_m \tau_g}{2} \cos\omega_m\left(t - \frac{\tau_g}{2}\right) \tag{6}$$

Where $$\emptyset_{b0} = \frac{2\pi\Delta L\Delta n}{\lambda} = \alpha \cdot V_{mod}^{p-p} = \pm\pi/2 \text{ for } f_m 1/2\tau_g.$$

$V_{mod}^{p-p}$ is the amplitude of modulation voltage, $\alpha$ is the voltage-phase conversion factor of phase modulator in (°/mV), $\emptyset_{b0}$ is the amplitude of the phase created inside the sensing coil, ΔL is the length difference of sensing coil to which the phase modulation is applied, Δn is the refractive index difference taking places on relevant crystal axis of the electro-optic modulator against the applied modulation voltage $V_{mod}^{P-P}$, and $f_m$ is the frequency of function generator applying phase modulation to phase modulator in Hz. A low coherent source in the sensing coil of IFOG interfere with each other at the middle of the coil and the standing wave contrasted by means of the phase modulation applied forms within this restricted length of the optical fiber, which is temporal coherence length, $L_c$ [2]. The term $\tau_g/2$ in Eq.(6) shows this point. Eq.(6) can be rearranged as in Eq.(7)

$$\Delta\emptyset_m(t) = \emptyset_b \cos \omega_m t \qquad (7)$$

Where $$\emptyset_b = 2\emptyset_{b0} \sin\frac{\omega_m \tau_g}{2}$$

and by writing $$t \to \left(t - \frac{\tau_g}{2}\right)$$

in Eq.(6). By using the Jacobi-Anger series expansion in terms of $1^{st}$ Kind Bessel Functions, the photocurrent stated in Eq.(3), the Eq.(8) is derived in terms of even and odd frequencies harmonics of the sine modulation applied to phase modulator.

$$I = \eta P_0 \{1 + (J_0(\emptyset_b) + 2J_2(\emptyset_b)\cos 2\omega_m t \ldots)\cos \emptyset_R + (2J_1(\emptyset_b)\cos \omega_m t + 2J_3(\emptyset_b)\cos 3\omega_m t + \ldots)\sin \emptyset_R\} \qquad (8)$$

For the first harmonics, after passing through the band pass filter of the demodulation circuit of IFOG, the photodiode current for $f_m = \frac{1}{2}\tau_g$ is $I_{\omega m}$, $$I_{\omega m} = 2\eta P_0 J_1(\emptyset_b)\sin \emptyset_R \text{ (A)} \qquad (9)$$

For square wave modulation, the form of Eq.(9) is given in Eq.(10) [3].

$$I_{\omega m}^{square} = 2\eta P_0 \sin \emptyset_b \sin \emptyset_R \text{ (A)} \qquad (10)$$

With the modulation frequency of $f_m = , \frac{1}{2}\tau_g$, $V_{mod}^{P-P}$ is so determined that $\emptyset_b$ makes the photodiode current maximum by taking voltage-phase conversion factor of phase modulator ($\propto$, °/mV) into account [4]. $\emptyset_b$ values making the photodiode current maximum are 1.8 rad for sine modulation type and $\pi/2$ rad for square wave modulation. When compared the square wave response with sine wave response, the square wave response is higher than that of sine wave response as "1/0.53". The demodulation voltage $V_{Gyro\_Coil}(\Omega)$ produced by photodiode current for sine wave modulation. "Gyro Coil" has a length of 1700 m, corresponding to $\tau_g = 8.57$ µs.

$$V_{Gyro\_Coil}(\emptyset_R^{Gyro\_Coil}) = 2\eta P_0 TFGJ_1(\emptyset_b)\sin(\emptyset_R^{Gyro\_Coil}) \text{ (V)} \qquad (11)$$

Where TF is transfer function of current-to-voltage converter in (V/A) and G characterizes the gain and ohmic loss of the demodulation circuit. The optical power $P_0$ includes all the optical loss in the IFOG circuit due to fusion splices, mating sleeves and MEMS FO ON/OFF switches. Eq.(11) can be written in the most general form as Eq.(12), regardless of square wave or sine wave response. The term $2\eta P_0$ TF G $J_1(\emptyset_b)$ will be called as $A_{1,j}$ in the next sections.

$$V_{Gyro\_Coil}(\emptyset_R^{Gyro\_Coil}) = A_1 \sin(A_2 \cdot \Omega + A_3) + A_4 \text{ (V)} \qquad (12)$$

Where,
$A_1 = 2\eta P_0$ TF G $J_1(\emptyset_b)$, electrical scale factor, (mV)

$$A_2 = \frac{8\pi N}{\lambda_0 c_0} A_{GC},$$

optical scale factor of IFOG sensing coil, (sec).
$\emptyset_R^{Gyro\_Coil} = A_2 \cdot \Omega$
$A_3 = \emptyset_{d\_opt}^{Gyro\_Coil} = \sqrt{\emptyset_{faraday}^2 + \emptyset_{shupe}^2 + \emptyset_{kerr}^2}$, optical drift parameter of IFOG sensing coil at any time, (°)
$A_4 = \emptyset_{d\_elect}^{Gyro\_Coil}$, electrical drift of IFOG at any time t, (mV) [5 and 6].

With the use of the IFOG having a demodulation output, the total angular displacement $D_j$, (also called as Tracking Orientation) is calculated Eq.(13) within time interval of Δt. Subscript j shows the time domain running with a developed software for this invention to be referred as "The software_2" in Description section when the DDM-IFOG in its normal operation, sensing the yaw rotation.

$$D_j(\Delta\Omega_j) = \Sigma_j \Delta\Omega_j \cdot \Delta t_j(°) \qquad (13)$$

$$\Delta\Omega = SF \cdot \Delta V(°/h) \qquad (14)$$

Where SF is scale factor of IFOG. For open loop IFOG, $SF_{open} = |\Omega|/V_{Gyro\_Coil}$ [7] and for closed loop IFOG $$SF_{closed} = \frac{\left[\frac{\lambda_0 c_0}{8\pi NA}\emptyset_{fb}\right]}{[V_{phase\_zeroing}]},$$

$\emptyset_{fb} = \propto V_{phase\_zeroing}$, [4]. The unit of scale factor is (°/h)/mV. The scale factor of open loop IFOG is not linear due to sine function in $V_{Gyro\_Coil}$ whereas the scale factor of closed loop IFOG is nearly flat [4]. Total instantaneous angular displacement $D_j$ can be written in terms of instantaneous SPS as follows $$D_j(\emptyset_{R,j}^{Gyro\_Coil}) = SF\Sigma_j \Delta V_j \cdot \Delta t_j(°) \qquad (15)$$

$$\Delta V_j = \{[A_{1,j} \sin(\emptyset_{R,j}^{Gyro\_Coil} + \emptyset_{d\_opt,j}^{Gyro\_Coil}) + \emptyset_{d\_elect}^{Gyro\_Coil}] - A_1^0[\sin(\emptyset_{d\_opt}^{0\_Gyro\_Coil}) + \emptyset_{d\_elect}^{0\_Gyro\_Coil}]\} \qquad (16)$$

Where $A_1^0$ and $A_{1,j}$ is the electrical scale factor of the demodulation circuit of the IFOG having "Gyro Coil" at initial time defined as t=0 and any instantaneous time t, respectively. $\emptyset_{d\_opt,j}^{0\_Gyro\_Coil}$ and $\emptyset_{d\_elect}^{0\_Gyro\_Coil}$ represent the instantaneous optical drift of the IFOG's sensing coil, and the electrical drift of the demodulation circuit of IFOG at initial time, respectively. The variation on $A_{1,j}$ $\sin(\emptyset_{R,j}^{Gyro\_Coil} + \emptyset_{d\_opt,j}^{Gyro\_Coil})$ is called as the drift of an IFOG when $\emptyset_{R,j}^{Gyro\_Coil} = 0 \cdot \Delta V_j$ is the instantaneous net voltage difference between zero rotation rate voltage of the demodulation circuit and SPS induced-voltage generated by the demodulation circuit. The electrical drift of the demodulation circuit manufactured with high quality active and passive electronic components together with the optical intensity stabilization of low coherent source, which the low coherence reduces the excess noise and backscattering noise effects causing random walk but dynamic range, is such small that it can be neglected as compared with the optical drift component. With good grounding and guarding practices on the demodulation circuit, it can be assumed that $\emptyset_{d\_elect}{}^{0\_Gyro\_Coil}$ at initial time is equal to $\emptyset_{d\_elect}{}^{Gyro\_Coil}$ at any time t. Final form of Eq.(16) is, $$\Delta V_j = \{[A_{1,j}\sin(\emptyset_{R,j}{}^{Gyro\_Coil} + \emptyset_{d\_opt,j}{}^{Gyro\_Coil})] - [A_1{}^0\sin(\emptyset_{d\_opt}{}^{0\_Gyro\_Coil})]\}(V) \quad (17)$$

If the Eq.(15) is re-arranged again by using Eq.(17) for the angular displacement of the yaw axis (z-axis) rotation within the time interval of $\Delta t$, $$D_j^{yaw}(\emptyset_{R,j}{}^{Gyro\_Coil}) = SF\Sigma_j\{A_{1,j}\sin(\emptyset_{R,j}{}^{Gyro\_Coil} + \emptyset_{d\_opt,j}{}^{Gyro\_Coil}) - A_1{}^0\sin(\emptyset_{d\_opt}{}^{0\_Gyro\_Coil})\} \cdot \Delta t_j(°) \quad (18)$$

Allan Variance, a time domain analysis, is implemented for the systems influenced by noise. The uncertainty in the useful data obtained from the system, is generated by the random errors caused by noisy effects. Hence the contribution of the variance of any noise source is calculated or estimated by the voltage data obtained under the absence of stimulating effect, such as angular rate for gyroscope. $\emptyset_{d\_opt,j}{}^{Gyro\_Coil}$ and $A_{1,j}$ are not static and have randomly changing behavior (dynamic behavior) in time. $\emptyset_{d\_opt}{}^{0\_Gyro\_Coil}$ is a static value together with $A_1{}^0$. Resultantly, the variance between $A_{1,j}\sin(\emptyset_{d\_opt,j}{}^{Gyro\_Coil})$ and $A_1{}^0\sin(\emptyset_{d\_opt}{}^{0\_Gyro\_Coil})$ is determined by Allan Variance, which is primarily defined and characterized before the IFOG is not put into operation. That $\emptyset_{d\_opt,j}{}^{Gyro\_Coil}$ is equal to $\emptyset_{d\_opt}{}^{0\_Gyro\_Coil}$ means no optical drift but in realistic world, $\emptyset_{d\_opt,j}{}^{Gyro\_Coil} \neq \emptyset_{d\_opt}{}^{0\_Gyro\_Coil}$ and $A_{1,j} \neq A_1{}^0$ due to random noise variables influencing on the sensing coil, and the optical emission source. In brief, the instantaneous drift of the IFOG runs in random behavior. The drift of an IFOG is the average output obtained from the demodulation circuit (total phase zeroing voltages applied to phase modulator, regardless of type of phase modulator, for closed loop IFOG) in °/h, when IFOG is not undergoing any influence of angular rate. Resultantly the drift resulted from random variation among the optical drift parameters $\emptyset_{d\_opt,j}{}^{Gyro\_Coil}$ and $\emptyset_{d\_opt}{}^{0\_Gyro\_Coil}$ and the variation on $A_{1,j}$ causes to grow the error at the angular displacement with time proportionally because of the integration in Eq. (18).

The drift of the IFOG, to be referred as the instantaneous drift herein, is fully composed of the optical drift $\emptyset_{d\_opt,j}{}^{Gyro\_Coil}$ and the drift (variation) on $A_{1,j}$.

Additional knowledge necessary for achieving this invention which concerns with the scale factor determinations of open-loop and closed-loop type IFOGs, the demodulation circuit characterizations with respect to the angular rate projections on the relevant latitudes, and the influences of polarization effects propagating inside the sensing coils along with manufacturing and winding process of the optical fiber comprising the sensing coil on the optical drift of an IFOG, which are the vital topics often addressed, was deeply investigated and introduced in [6, 7, 8, and 9].

Regarding the most related international patents still in progress to the presented invention;

The pioneering step in construction of a fiber ring interferometer was the study proposed in the East-Coast Conference of the SPIE in Reston, Va. by Vali et al. on March 22 and 23 of 1976 but this study is non-patented. The presented invention described in this text contains software supported-structural modifications to monitor and derive the instantaneous drift, directly corresponding to the zero rotation rate voltage of the demodulation circuit of the DDM-IFOG with "Gyro Coil", the sensitive surface vector of which is placed parallel to z-axis (yaw axis) as in FIG. 1, under the influence of continuous yaw rotation rate on the reduced IFOG configuration patented as "Reduced minimum configuration interferometric fiber optic gyroscope with simplified signal processing electronics", the patent number of which is U.S. Pat. No. 6,351,310 (B1).

According to US 2011126647, this patent disclosure, US2011126647 (A1), deals with the drift compensation MEMS (Micro-Electro-Mechanical Structure) gyroscopes. In the method presented in US 2011126647 (A1), MEMS gyroscope is sequentially oriented to the first and the second orientations, inverted as 180°, relative to each other by a motor which generates a rotation of 180°. Then the unpredicted drift of MEMS-based gyroscope is determined by comparing two signals. The presented invention differs from the invention disclosure in US2011126647 (A1) in that the following aspects: the invention presented as a novel Interferometric Fiber Optic Gyroscope (IFOG) and the method is related to monitoring and determining the instantaneous drift of IFOG under continuous yaw rotation without disturbing the current orientation of the sensing coil of the IFOG configuration invented. Instead of the sequentially and/or periodically re-orienting the sensing coil, "Gyro Coil" on z-axis (yaw axis) in the presented invention, a secondary fiber coil "Monitor Coil" on x-axis (pitch axis) is used by switching both of the coils through MEMS FO ON/OFF switches.

Furthermore, the method, which is subjected to compensating the inherent drift of gyroscope, introduced in WO2010114915 (A2) covers the transfer of the heuristic assumptions to the accumulator circuit, such as swaying, curving or turning, for slowly-varying drift errors by means of a feedback loop control. The presented invention doesn't contain any heuristic assumption to monitor, derive, and compensate the unpredictable drift of the IFOG in real time. The presented invention is fully different from WO2010114915 (A2).

REFERENCES

[1] Loukianov D, Rodloff R, Sorg H, Steiler B 1999 Optical Gyros and their Applications (The Research and Technology Organization (RTO) of NATO printed by Canada Communication Group Inc.), Section 5.4.
[2] Bergh R A, Culshaw B, Cutler C C, Lefevre H C, and Shaw H J 1982 Source statistics and the Kerr effect in fiber-optic gyroscopes, *Optics Letters,* 7 no. 11 563-565.
[3] H. Lefevre, 1993, *The Fiber-Optic Gyroscope,* Artech House, Boston and London, Chapters 5, 6, and 7.
[4] Celikel O and San S E 2009 Establishment of All Digital Closed-Loop Interferometric Fiber-Optic Gyroscope and Scale Factor Comparison for Open-Loop and All Digital Closed-Loop Configurations. *IEEE Sensors Journal* 9 no. 2 176-186.
[5] Moeller, R. P.; Burns, W. K. and Frigo, N J 1989 Open loop output and scale factor stability in a fiber optic gyroscope. *Journal of Lightwave Technology.* 7, 262-269.
[6] Celikel O and Sametoglu F 2012 Assessment of magneto-optic Faraday effect-based drift on interferometric single-mode fiber optic gyroscope (IFOG) as a function of variable degree of polarization (DOP), *Measurement Science & Technology,* 23, 025104 (17 pp).
[7] Celikel O, Sametoglu F, and Sozeri H 2010 Optoelectronic Design Parameters of Interferometric Fiber Optic Gyroscope with $LiNbO_3$ having North Finder Capability and Earth Rotation Rate. Measurement *Indian Journal of Pure & Applied Physics* 48 375-384.
[8] Celikel O 2012 Application of the vector modulation method to the north finder capability gyroscope as a directional sensor, *Measurement Science & Technology,* projected angular 22 035203 (12 pp).

[9] Celikel O 2007 Construction and characterization of interferometric fiber optic gyroscope (IFOG) with erbium doped fiber amplifier (EDFA). *Opical and Quantum Electronics* 39 147-156.

SUMMARY

The aim of this invention is to monitor and derive the instantaneous drift of the IFOG, to discard $A_1^0 \sin(\emptyset_{d\_opt}^{0\_Gyro\_Coil})$ from $D_j^{yaw}(\emptyset_{R,j}^{Gyro\_Coil})$ in Eq.(18) by deriving "$A_{1,j} \sin(\emptyset_{d\_opt,j}^{Gyro\_Coil})$" and finally to write the derived "$A_{1,j} \sin(\emptyset_{d\_opt,j}^{Gyro\_Coil})$" in place of $A_1^0 \sin(\emptyset_{d\_opt}^{0\_Gyro\_Coil})$ in Eq. (17). With the invention, Eq.(18) is transformed into Eq.(19) and due to the instantaneous drift within the time duration $\Delta t$, on which the angular rate is to be measured, the derived instantaneous demodulation voltage difference ($\Delta V_j^{Derived}$) between instantaneous zero rotation rate voltage of the demodulation circuit and SPS induced-demodulation voltage is accurately determined. Eq. (19) gives more reliable voltage difference than Eq.(18) due to the absence of $A_1^0 \sin(\emptyset_{d\_opt}^{0\_Gyro\_Coil})$. Instead, Eq.(19) contains $A_{1,j} \sin(\emptyset_{d\_opt,j}^{Gyro\_Coil})$ thanks to this invention. In this case the corrected instantaneous yaw angular displacement $D_j^{corr\_yaw}(\emptyset_{R,j}^{Gyro\_Coil})$, instead of $D_j^{yaw}(\emptyset_{R,j}^{Gyro\_Coil})$, is given as in Eq.(19).

$$D_j^{corr\_yaw}(\emptyset_{R,j}^{Gyro\_Coil}) = SF \cdot \Sigma_j A_{1,j} \{\sin(\emptyset_{R,j}^{Gyro\_Coil} + \emptyset_{d\_opt,j}^{Gyro\_Coil}) - \sin(\emptyset_{d\_opt,j}^{Gyro\_Coil})\} \cdot \Delta t_j(°) \quad (19)$$

Where $\Delta V_j^{Derived} = \{A_{1,j} \sin(\emptyset_{R,j}^{GyroCoil} + \emptyset_{d\_opt,j}^{GyroCoil}) - A_{1,j} \sin(\emptyset_{d\_opt,j}^{GyroCoil}) \cdot A_{1,j}$ is transformed into the common electrical scale factor with this invention because $A_{1,j} \sin(\emptyset_{d\_opt,j}^{Gyro\_Coil})$ is a parameter which can instantaneously be derived by "Monitor Coil" of the IFOG configured a newly and associated with the method to be described in this invention.

$A_{1,j} \sin(\emptyset_{d\_opt,j}^{Gyro\_Coil})$ is directly equal to $V_{Gyro\_Coil,j}^{Drift}$. According to Eq.(19), in order to facilitate the understanding of the advantage of Eq.(19) with respect to Eq.(18), it is sufficient to make an assessment under the condition of small angle approach. $\emptyset_{R,j}^{Gyro\_Coil}$ and $\emptyset_{d\_opt,j}^{Gyro\_Coil}$ in sine function in Eq. (19) are inseparable parameters, and they cause to produce an integrated demodulation voltage output, induced by both the angular rate aimed to be measured, $\emptyset_{R,j}^{Gyro\_Coil}$, and the instantaneous optical drift parameter, $\emptyset_{d\_opt,j}^{Gyro\_Coil}$. This invention introduces a new method to derive $A_{1,j} \sin(\emptyset_{d\_opt,j}^{Gyro\_Coil})$, the instantaneous drift of the IFOG having "Gyro Coil" still sensing the angular rate, oriented to yaw (z axis), and the IFOG in this invention is called as "*Dynamically Drift Monitoring—Interferometric Fiber Optic Gyroscope (DDM-IFOG)*" in this text.

As stated above, the relationship between $A_{1,j} \sin(\emptyset_{d\_opt,j}^{Gyro\_Coil})$ and $A_1^0 \sin(\emptyset_{d\_opt}^{0\_Gyro\_Coil})$, called as variance, are estimated as a long term average due to random behavior of the optical drift phenomenon taking places inside of the optical fiber and the $P_0$ based-variations on $A_{1,j}$ before the IFOG is not put into operation. This method is the first and single method for establishing the relationship between $A_{1,j} \sin(\emptyset_{d\_opt,j}^{Gyro\_Coil})$ and $A_1^0 \sin(\emptyset_{d\_opt}^{0\_Gyro\_Coil})$. However, the second way is this invention, and the invention puts a new configuration of IFOG and a new method into progress so as to monitor and derive the instantaneous drift of the IFOG, $A_{1,j} \sin(\emptyset_{d\_opt,j}^{Gyro\_Coil})$, by a secondary sensing coil, the length of which is different from that of the "Gyro Coil", called as "Monitor Coil" in this text. The "Monitor Coil" is located perpendicular to the axis of the "Gyro Coil". The "Monitor Coil" is settled along x-axis (pitch). The perpendicularity of the "Gyro Coil" and "Monitor Coil", relatively to one another, defines the accuracy of the determination of $A_{1,j} \sin(\emptyset_{d\_opt,j}^{Gyro\_Coil})$ by the "Monitor Coil" because the DDM-IFOG rotates around z-axis (yaw), the angular rate of which is being detected by the "Gyro Coil" in real time and continuously. That is, the rotation around y-axis (roll) of the IFOG in the invention isn't allowed in order to prevent angular rate projection on the "Monitor Coil" due to continuous rotation around yaw axis (z-axis).

BRIEF DESCRIPTION OF DRAWINGS

FIG. 3 covers the first measurement with the DDM-IFOG, the subject of this invention. Each coil is sequentially switched for 200 ms. The software_1, named as, "Gyro_CompensationGamma.c", runs. While one coil is IN the DDM-FOG, another is OUT the IFOG. "Gyro Coil" and "Monitor Coil" are sequentially switched for 200 ms (duty cycle is ½ for each coil). The demodulation voltage data of both coils were collected within 2 h.

DESCRIPTION

Figure 2:
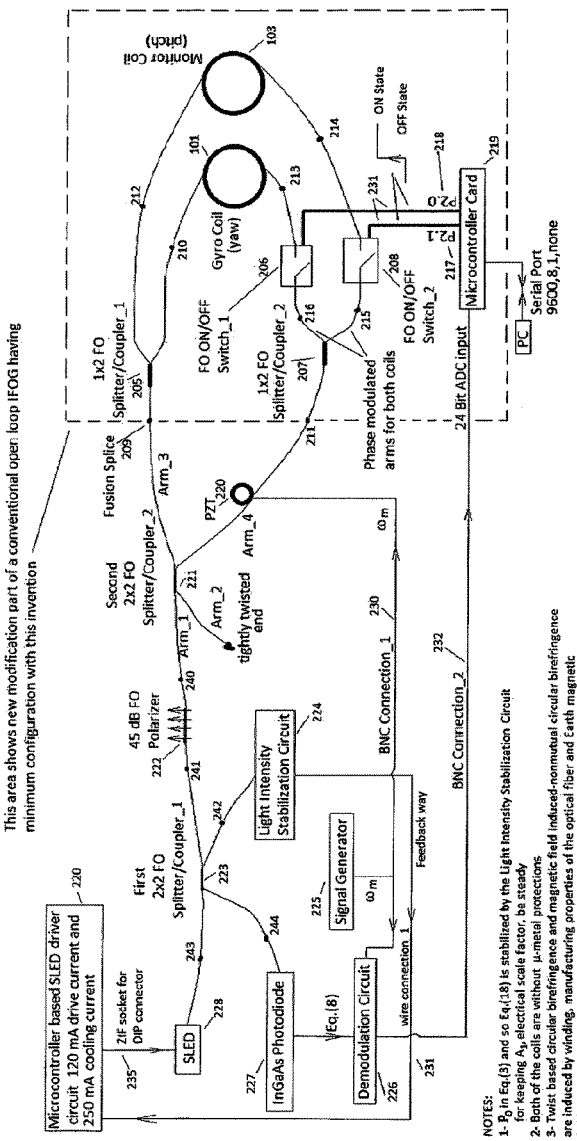
FIG. 2 shows the fully descriptive illustration of the novel DDM-IFOG, for which the invention is claimed, which has the yaw and pitch orientations of both coils depicted in FIG. 1.

The DDM-IFOG to be described in this invention is a preferred embodiment. The instantaneous optical drift of "Gyro Coil" 101 is primarily composed of Magnetooptic Faraday Effect (MOFE), Shupe Effect, and Kerr Effect. However the drift of an IFOG means the integrated form of whole of optical drift and the variation on the electrical scale factor of the DDM-IFOG $A_{1,j}$. The DDM-IFOG configuration in FIG. 2 and the method stated herein are invented to monitor, and to derive the instantaneous drift of the DDM-IFOG having "Gyro Coil" 101 by means of "Monitor Coil" 103. In FIG. 2, spectral bandwidth of SLED 228 emission is 62.0 nm at FWHM (full width at half maximum) centered at 1562.00 has an integrated optical power of ~600 µW. The injected optical power injected into each coil is around 60 µW. Temporal coherence length $L_c$ is 39.4 µm. Kerr effect takes places within $L_c$. The estimated Kerr effect based nonreciprocal phase error is an order of $10^{-7}$°/h, corresponding to $1.66 \times 10^{-12}$ rad. The opto-geometric configuration of the IFOG, an angular rate of 1°/h corresponds to a SPS of $1.66 \times 10^{-5}$ rad (~$9.5 \times 10^{-4}$°) and a phase change of ~$1.70 \times 10^{-12}$ rad is too small for detection. The remaining drift parameters are Magnetooptic Faraday Effect (MOFE) and Shupe Effect. The detailed experimental introductions for MOFE based optical drift, such as fiber inhomogeneity length due to fiber fabrication process, degree of polarization (DOP) of electromagnetic waves interfering, circular birefringence effects resulted from both the external magnetic field and the special twist of fiber in winding and manufacturing processes, and linear birefringence effect, were given in [6]. Therefore the use of the single mode optical fiber coils called as "Gyro Coil" 101 and "Monitor Coil" 103 obtained from the same manufacturer guarantees to keep the statistical distribution of inhomogeneity length, linear and twist based circular birefringence characteristics be ultimately identical. In addition to ultimate manufacturing and winding identities of both coils, "Monitor Coil" 103 is mounted as possible as close to "Gyro Coil" 101 in FIG. 2 to hold them in the same thermal and acoustical circumference where the DDM-IFOG senses rotation rate. The distance between both "Monitor Coil" and "Gyro Coil" is 1 cm. The optical fibers used as "Monitor Coil" 103 and "Gyro Coil" 101 manufactured by Draka Communication are Bendbrigth type-single mode. According to both theoretical and experimental study presented in [6], MOFE is independent of the degree of polarization injected into the single mode fiber optic sensing coil. The dependence of MOFE based drift is a function of inhomogenity length of the relevant single mode optical fiber creating a spatial power spectrum density of the cross coupled polarization modes ($s_3$, normalized stokes parameter) inside the optical fiber together with twist based circular birefringence under the magnetic field influence. As a result, although the rotation of the principle polarization axes of the optical fiber connections inside FO ON/OFF switches 206,208 in FIG. 2 may change, and the rotation of principle rotation axes varies DOP of electromagnetic waves propagating injected into the sensing coil arms, MOFE based drift interior of any single mode coil doesn't change, depending on the DOP of interfering waves. The independence of MOFE based optical drift from DOP of electromagnetic waves injected in the sensing coil arms is experimentally demonstrated within a DOP range extending from 78.00% to 0.15%. The optical powers of both coils falling onto InGaAs photodiode 227 change only. With the method in this invention the optical power ($P_0$) change can still be monitored and compensated when "Gyro Coil" 101 in IN the DDM-IFOG. This compensation is shown with the ratio of the amplitudes in Eq.(29).

Therefore, this invention provides to monitoring and deriving the instantaneous optical drift ($\emptyset_{d\_opt,j}^{Gyro\_Coil}$) of "Gyro Coil" 101, influenced by continuous angular rate around z-axis of "Gyro Coil" 101 (yaw), caused by MOFE and Shupe Effect, together with the changes on the optical power. The coil winding method is not quadrupolar (or dipolar) used to compensate the thermal and acoustic transient effects on the CW and CCW ways of the interfering electromagnetic waves. The both coils are wound with the style of standard telecommunication optical fiber. The DDM-IFOG having both "Gyro Coil" 101 and "Monitor Coil" 103 is placed in the acoustically, and thermally-controlled environment of Optics Laboratory of National Metrology Institute of TURKEY. It is still very problematic situation to obtain exact information about how many portion of instantaneous optical drift is induced by MOFE (or Shupe effect), because of these quantities are noise figures and the chaotic behavior of the noisy figures in any sensor system is an inherent condition for all of the noise components. As a result to say is not wrong that whilst the small portion of instantaneous optical drift to be monitored and derived is induced by Shupe Effect, the large portion of the instantaneous optical drift to be monitored and derived is composed of MOFE based contribution.

Detailed Explanations of Connections of the Components in the DDM-IFOG

1. The minimum configuration of an open loop IFOG having minimum configuration is constructed.
2. The output ports of 2×2 fused fiber single mode fiber optic coupler 221 of the open loop IFOG configuration in FIG. 2, are connected to two 1×2 fused fiber splitter/couplers 205,207 by the fusion splices 209,211 shown in FIG. 2 to construct the DDM-IFOG in FIG. 2.
3. One arm of a 1×2 fused fiber coupler_1 205 is fusion spliced 210 to "Gyro Coil" 101, and another arm of 1×2 fused fiber coupler_1 205 is fusion spliced 212 to "Monitor Coil" 103.
4. To create the interference based on temporal coherence, depending on the stretch of PZT 220 and the spectral bandwidth of SLED 228 for both "Gyro Coil" 101 and "Monitor Coil" 101, the fiber part coming from phase modulator (PZT 220) is connected to the arm of 1×2 fused fiber coupler_2 207 by the fusion splice 211. The optical way of 1×2 fused fiber coupler_2 207 is common way in which the sine-reciprocal phase modulated electromagnetic waves in Eq.(7) are created for both coils 101,103.

5. MEMS FO ON/OFF switches 206,208 are optically bidirectional structure, giving rise to allowing to pass the interfering light waves counter propagating in both "Gyro Coil" 101 and "Monitor Coil" 103, carrying SPS.

6. One arm of 1×2 fused fiber coupler_2 207 is connected to MEMS FO ON/OFF switch_1 206 via the fusion splice 216. Another arm of 1×2 fused fiber coupler_2 207 is joined with MEMS FO ON/OFF switch_2 208 by the fusion splice 215.

7. MEMS FO ON/OFF switch_1 206 is connected to "Gyro Coil" 101 by the fusion splice 213 and MEMS FO ON/OFF switch_2 208 is connected to "Monitor Coil" 103 by the fusion splice 214.

8. P2.0 pin 218 of the microcontroller card 219 embedded with the software_2 is connected to the electric control pin of MEMS FO ON/OFF switch_1 206, switching "Gyro Coil" 101.

9. P2.1 pin 217 of the microcontroller card 219 embedded with the software_2 is connected to the electric control pin of MEMS FO ON/OFF switch_2 208, switching "Monitor Coil" 103.

10. The formation of the signalization is demonstrated in FIG. 3. Both MEMS FO ON/OFF switches 206,208, manufactured by DiCon Fiberoptics, are transparent. Transparent type means that 5 V is transparency voltage and 0 V is opacity voltage.

11. Both coils 101,103 are phase modulated with the same electrical signal by means of the fusion splices 211, 216, 215, 213, 214.

The Series of the First Measurement

Figure 1:
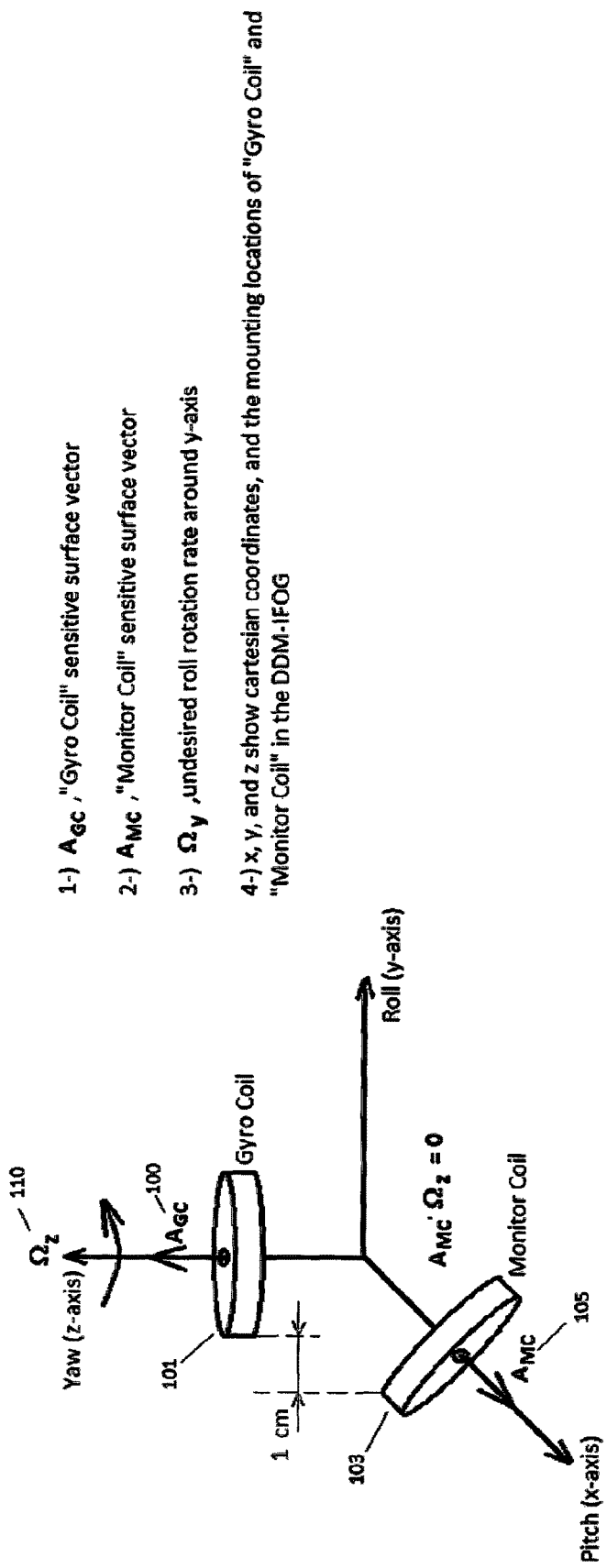
FIG. 1 shows the exact orientations of "Gyro Coil" and "Monitor Coil" on the IFOG. The DDM-IFOG is principally is composed of synchronously and continuously switchable two single mode fiber optic coils, orthogonally located each other.

The series of the first measurement covers to determination of "γ-correlation-coefficient" providing a correlation factor between the instantaneous optical drift $\emptyset_{d\_opt,i}^{Gyro\_Coil}$ of "Gyro Coil" together with the instantaneous variation (drift) on electrical scale factor $A_{1,i}$ and $V_{Monitor\_Coil}$ ($\emptyset_R^{Monitor}$) to be defined in this invention. Subscript "i" shows the time domain of the first measurement stage applied by the software_1. Both "Gyro Coil" 101 and "Monitor Coil" 103 have the same manufacturing and winding processes which guarantee the very close and similar linear and twist based circular birefringence distributions for the both coils. Additionally they are influenced by the same uniform Earth magnetic field in the laboratory. Both coils 101,103 assembled in the same open loop IFOG minimum optical configuration frame in this invention are exposed to in the same phase modulation condition by the same signal generator 225, have the same light intensity stability circuit 224, the same SLED 228 emission, producing reference frequency and have the same demodulation circuit 226 to extract SPS in FIG. 2. The instantaneous drifts of the DDM-IFOG having both "Gyro Coil" 101 and "Monitor Coil" 103 were collected along 2 hours with the durations of 200 ms sequentially and consecutively by means of the microcontroller card including in the embedded software_1 developed for this invention. When P2.1 217 is 5 V, P2.0 218 is done 0 V by software_1 instantly. The states of MEMS FO ON/OFF switches 206,208 provide the condition in which "Monitor Coil" 103 is IN the DDM-IFOG and "Gyro Coil" 101 is OUT the DDM-IFOG. There isn't any angular rate projection on $A_{MC}$ 105 so SPS on "Monitor Coil" 103, $\emptyset_R^{Monitor}$, only consist of instantaneous drift parameter of the DDM-IFOG with "Monitor Coil" 103. The zero SPS on "Monitor Coil" 103, $\emptyset_R^{Monitor}=0$ is inherent result of the DDM-IFOG presented in this invention due to relatively orthogonal placements of "Gyro Coil" 101 and "Monitor Coil" 103 as seen in FIG. 1.

$$V_{Monitor\_Coil}(\emptyset_R^{Monitor})=2\eta P'_0 TFGJ_1(\emptyset_b)$$
$$\sin \emptyset_R^{Monitor}=B_1 \sin \emptyset_R^{Monitor} \qquad (20)$$

Where $B_1$ is the electrical scale factor of the IFOG operating with "Monitor Coil" 103. This is achieved by orienting "Monitor Coil" 103 along x-axis (pitch axis) so $A_{MC}$ 105 of FIG. 1 is parallel to East-West axis with reference to the direction of Earth rotation rate, ($\Omega_{Earth}$ 712). In this case $\emptyset_R^{Monitor} \rightarrow \emptyset_{d\_opt,i}^{Monitor\_Coil}$. Even though the output of demodulation circuit 226 is similar to that of Eq.(11), the correct demodulation voltage is given in Eq.(20). The band pass filter of the demodulation circuit 226 is centered at $\omega_m$ (rad/s) and so, the even frequency components are discarded by this band pass filter. Phase bias term is $\emptyset'_b$ instead of $\emptyset_b$ due to the length of "Monitor Coil" 103 of 1230 m, corresponding to a transit time of $\tau_g=6.170$ μs, and optical power falling onto InGaAs photodiode 227 mounted on the demodulation circuit 226 is $P'_0$ instead of $P_0$ due to the total spectral attenuation of "Monitor Coil" 103, the switching repeatability of MEMS FO ON/OFF switches 206,208, and the variations at the splitting ratio of 1×2 splitter/couplers 205,207. Phase bias term $\emptyset'_b$ at $\omega_m$ is 1.721 rad for a fiber length of 1230 m of "Monitor Coil" 103, the modulation frequency ($f_m$) of 65.72100 KHz, and the modulation amplitude of 6.30 Vpp, supplied by the signal generator 225.

Figure 3:
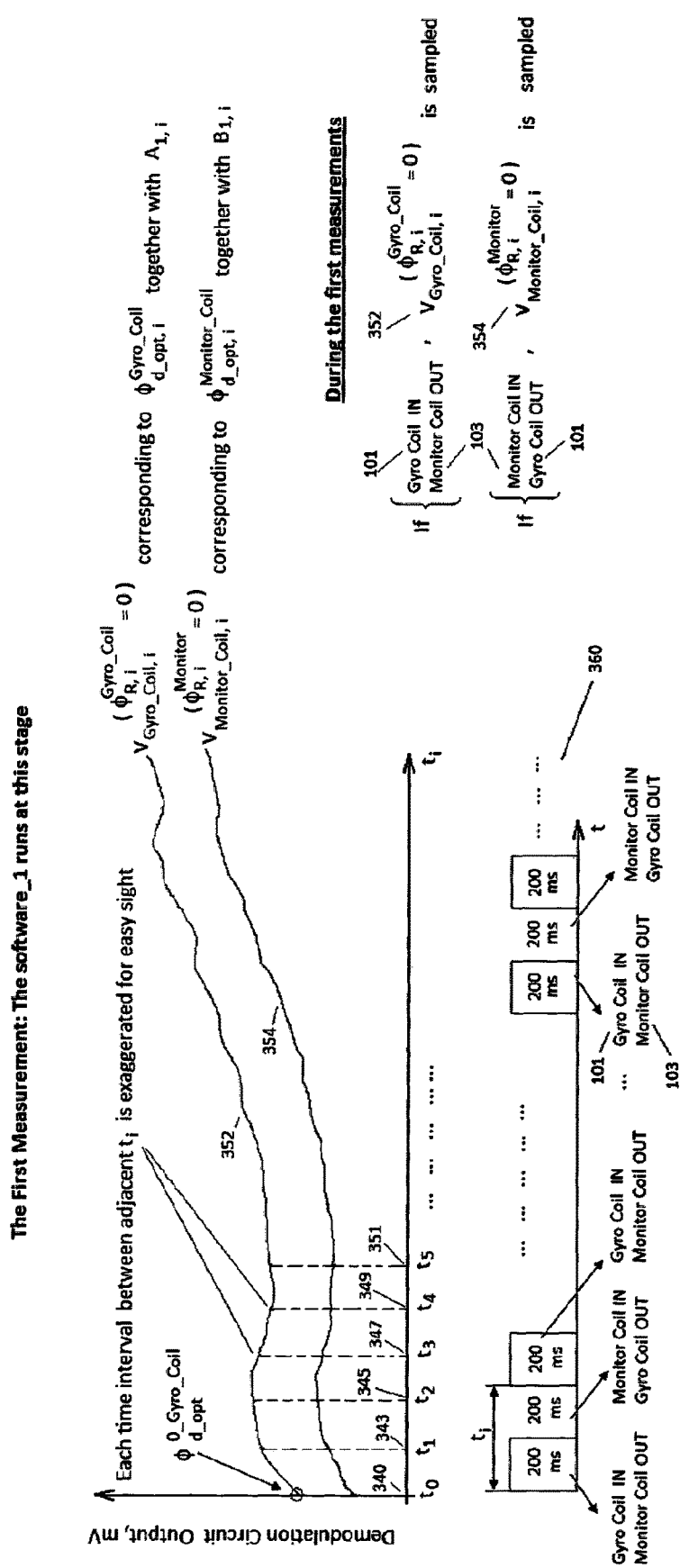
FIG. 3 shows the proportionality of the demodulation circuit voltage outputs generated by "Gyro Coil" and "Monitor Coil" under zero angular rate induction. The software_1 runs.

According to these measurement results given in FIG. 3, the individual drift of the DDM-IFOG having both "Gyro Coil" 101 and "Monitor Coil" 103 containing optical drift parameters $\emptyset_{d\_opt,i}^{Gyro\_Coil}$ and $\emptyset_{d\_opt,i}^{Monitor\_Coil}$ run nearly parallel due to the same manufacturing, and the same winding processes of "Gyro Coil" 101 and "Monitor Coil" 103, the use of the same modulation application, the same demodulation circuit 226 connections, and the same minimum open loop IFOG configuration connections to some degree for both "Gyro Coil" 101 and "Monitor Coil" 103 as seen in FIG. 2.

In FIG. 3, "Gyro Coil" 101 and "Monitor Coil" 103 is switch IN and OUT for a duration 200 ms and $V_{Monitor\_Coil,i}(\emptyset_{R,i}^{Monitor}=0)$ 354 and $V_{Gyro\_Coil,i}(\emptyset_{R,i}^{Gyro\_Coil}=0)$ 352, meaning no influence of angular rate on both coils 101, 103, are synchronously sampled by the analog-to-digital converter of the microcontroller card 219. The nearly parallel running between $V_{Monitor\_Coil,i}(\emptyset_{R,i}^{Monitor}=0)$ 354 and $V_{Gyro\_Coil,i}(\emptyset_{R,i}^{Gyro\_Coil}=0)$ 352 gives us information on the instantaneous drift, associated with instantaneous optical drift $\emptyset_{d\_opt,i}^{Gyro\_Coil}$, of the DDM-IFOG "Gyro Coil" 101 at any time provided that $V_{Monitor\_Coil,i}(\emptyset_{R,i}^{Monitor}=0)$ 354 is known while "Gyro Coil" 101 rotates around z-axis! This point is the main idea of this invention. The restriction of the rotation direction of the DDM-IFOG around z-axis only and the orientation of the sensitive surface $A_{MC}$ 105 of "Monitor Coil" 103 along x-axis (pitch) provide us to $A_{MC} \cdot \Omega_z = 0$, $V_{Monitor\_Coil,i}(\emptyset_{R,i}^{Monitor}=0)$ 354 in FIG. 1. The DDM-IFOG for which the invention is claimed, is limited to yaw axis rotation only and so SPS ($\emptyset_{R,i}$) is induced inside "Gyro Coil" 101 only, which is oriented along z-axis (yaw) as seen in FIG. 1. Due to the perpendicular orientation of "Monitor Coil" 103 with respect to z-axis (yaw), dot product of $\Omega_z$ 110 with $A_{MC}$ 105 in FIG. 1 is nearly zero, and so SPS is not induced inside "Monitor Coil" $\emptyset_{R,i}^{Monitor}=0$. By applying the measurements along 2 hours in FIG. 3, the average of ratios of $V_{Gyro\_Coil,i}(\emptyset_{R,i}^{Gyro\_Coil}=0)$ 352 to $V_{Monitor\_Coil,i}(\emptyset_{R,i}^{Monitor}=0)$ 354 is calculated.

$$V_{Gyro\_Coil,i}(\emptyset_{R,i}^{Gyro\_Coil} = 0)|_{t_i} = \gamma_{t_i} \cdot V_{Monitor\_Coil,i}(\emptyset_{R,i}^{Monitor} = 0)|_{t_i} \quad (21)$$

$$\gamma_{t_0} = \frac{A_1 \sin(\emptyset_{d\_opt}^{0\_Gyro\_Coil})}{B_1 \sin(\emptyset_{d\_opt}^{0\_Monitor\_Coil})} \quad (22)$$

$$\gamma_{t_1} = \frac{A_{1,i} \sin(\emptyset_{d\_opt,i}^{Gyro\_Coil})}{B_{1,i} \sin(\emptyset_{d\_opt,i}^{Monitor\_Coil})}$$

$\gamma_{t_0}$ and $\gamma_{t_i}$ are very close to each other for the optical fiber sensing coils obtained from the same manufacturing and winding processes in addition to these characteristics, "Gyro Coil" 101 and "Monitor Coil" 103 are joined together to the common optical circuit and the common demodulation circuit 226 in FIG. 2 supplied with 1×2 FO splitters/coupler 205, 207 associated with MEMS FO ON/OFF switches 206, 208 used in this invention. The closeness of $\gamma_{t_0}$ and $\gamma_{t_i}$ to each other is graphically demonstrated in FIG. 3.

$$\bar{\gamma} = \frac{1}{N} \sum_i^N \gamma_{t_i} \quad (23)$$

Where $\bar{\gamma}$ 780 is the averaged γ-correlation-coefficient calculated from $\gamma_{t_i}$, and N is the number of the measurements carried out in the first measurement stage. According to the observation results presented graphically in FIG. 3, Eq.(20) is written. A series of "γ-correlation-coefficient" are retrieved by means of the microcontroller card 219 embedded with the software-1 at each point shown with $t_i$ and send into PC through HyperTerminal, compatible with the protocol, "9600, 8, 1, none". The average value of $\gamma_{t_i}$ from the data series is calculated. When FIG. 3 is seen and the process and the measurements given in this section are evaluated, the change rate of the zero rotation rate voltage of the demodulation circuit 226 of the DDM-IFOG should be slower than $t_i$=400 ms determined for this implementation because the sequential demodulation voltage data should be close to adjacent demodulation voltage so as to guarantee the flatness of $\bar{\gamma}$ 780 caused by proportionality as seen in FIG. 3. The behavior of the drift, monitored, and derived should be similar to that in FIG. 3, and the deriving of the instantaneous optical drift of "Gyro Coil" 101 together with the variation on $P_0$ mustn't change sharply. That is, this method and the configuration given in this invention is valid for the drift term, changing relatively slowly, together with the amplitude of the instantaneous optical drift of "Gyro Coil" 101, defined as $A_{1,i}$, rather than noise figure.

It should be noted that the most disturbing effect for the flatness among $\gamma_{t_i}$ values, marked as $\gamma_{t_i}$, is the variations on the gradients resulted from Shupe effect based thermal and acoustic transients on "Gyro Coil" 101 and "Monitor Coil" 103. That the enhancement of the flatness among $\gamma_{t_i}$ values is increased with the use of the both of "Gyro Coil" 101 and "Monitor Coil" 103 having quadrupolar (or dipolar) type windings at the DDM-IFOG is definitely obvious.

The Flow of the First Measurement Series:
1. The DDM-IFOG in FIG. 2 is operated at the rated optical power of SLED 228, ~600 μW.
2. The demodulation circuit in FIG. 2 is operated by applying ±15 V. The details of the demodulation circuit 226 are presented in [4, and 10].
3. Signal generator generating reference angular frequency at $\omega_m$=412728 rad/s, corresponding to linear frequency of 65.72100 KHz. The amplitude of the reference frequency is 6.30 Vpp, producing sine (or square wave)-biasing modulation in Eq. (6), and applied to PZT 220 by signal generator 225 in FIG. 2.
4. The light intensity stabilization circuit 224 is activated by a manual switch of in FIG. 1. Then the signalization to be applied to MEMS FO ON/OFF switches 206,208, shown in FIG. 3, is started by the microcontroller card 219 including the embedded software_1 developed peculiarly for this invention when the DDM-IFOG operating is not under any angular rate influence by inclining "Gyro Coil" 101 (yaw axis) from North to South as 40.8°, which is the latitude of Gebze TURKEY, to prevent the Earth rotation rate projection. "Monitor Coil" 103 shows East-West direction, and the sensitive surface vector $A_{MC}$ 105 of "Monitor Coil" 103 is still perpendicular to $\Omega_{Earth}$ 712 ($A_{MC} \perp \Omega_{Earth}$) Mark "⊥" shows the perpendicularity of the sensitive surface vector of the relevant sensing coil to the relevant angular rate axis in geometric notation.
5. According to the signalization 360 creating a series of switching processes of MEMS FO ON/OFF switches 206,208, each of the both sensing coils 101,103 is sequentially connected to the DDM-IFOG circuit for a time duration of 200 ms. Whilst one coil is IN, another is OUT.
6. When "Gyro Coil" 101 is IN the DDM-IFOG, and "Monitor Coil" 103 is OUT for 200 ms, $V_{Gyro\_Coil,i}(\emptyset_{R,i}^{Gyro\_Coil}=0)|_{t_i}$ is sampled by the analog-to-digital converter of the microcontroller card 219 containing the embedded software_1 and the voltage data is transferred into PC via Hyperterminal.
7. When "Monitor Coil" 103 is IN the IFOG, and "Gyro Coil" 101 is OUT for 200 ms, $V_{Monitor\_Coil,i}(\emptyset_{R,i}^{Monitor}=0)$ 354 sampled by the analog-to-digital converter of the microcontroller card 219 containing the embedded software_1 and the voltage data is transferred into PC via Hyperterminal.
8. And finally $\gamma_{t_i}$ in Eq.(22) and $$\bar{\gamma} = \frac{1}{N} \sum_i^N \gamma_{t_i}$$

780 in Eq.(23) are calculated from the sampled voltages of the demodulation circuit 226.
9. $\bar{\gamma}$ 780, the averaged γ-correlation-coefficient, is then entered in the software_2 developed, the details of which are presented in "The Second Measurement".

The Series of the Second Measurement

The series of the second measurement is composed of two parts. The first part is related to determining the offset voltage $V_{off}$ 800 to be described in the following and the second part is concerning with monitoring and deriving of the instantaneous drift in real time when the DDM-IFOG continues rotating according to several $A_{GC}$ 100 orientations of the "Gyro Coil" 101.

In order to change the time domain for the series of the second measurement, the subscript "j" shows the time domain of the second measurements stage. In other words, subscript "j" corresponds to the timing, the signalization 660 and the sampling processes created by the software_2. When the DDM-IFOG rotates around z-axis; "Gyro Coil" 101 generates $V_{Gyro\_Coil,j}(\emptyset_{R,j}^{Gyro\_Coil}) = A_{1,j} \sin(\emptyset_{R,j}^{Gyro\_Coil} + \emptyset_{d\_opt,j}^{Gyro\_Coil})$ 480 "Monitor Coil" generates $V_{Monitor\_Coil,j}(\emptyset_{R,j}^{Monitor}) = B_{1,j} \sin(\emptyset_{d\_opt,j}^{Monitor\_Coil})$ 585 due to $\emptyset_{R,j}^{Monitor} = A_{MC} \cdot \Omega_z = 0$.

By relying on the good flatness of the averaged "γ-correlation-coefficient" calculated from the first measurement, when "Gyro Coil" continue to rotate around z-axis, the demodulation circuit voltage output $V_{Gyro\_Coil,j}^{Drift}$ still being generated by the instantaneous optical drift we can write the Eq.(24). However, it is not practically possible to measure $V_{Gyro\_Coil,j}^{Drift}$ when the DDM-IFOG is rotating without applying repetitive inclination processes of $A_{GC}$ 100 with respect to rotation rate direction. $V_{Gyro\_Coil,j}^{Drift}$ is the real instantaneous zero rotation rate voltage of the demodulation circuit 226 of the DDM-IFOG with "Gyro Coil" 101 any time t.

$$V_{Gyro\_Coil,j}^{Drift} = A_{1,j} \sin(\emptyset_{d\_opt,j}^{Gyro\_Coil}) \qquad (24)$$

Figure 5:
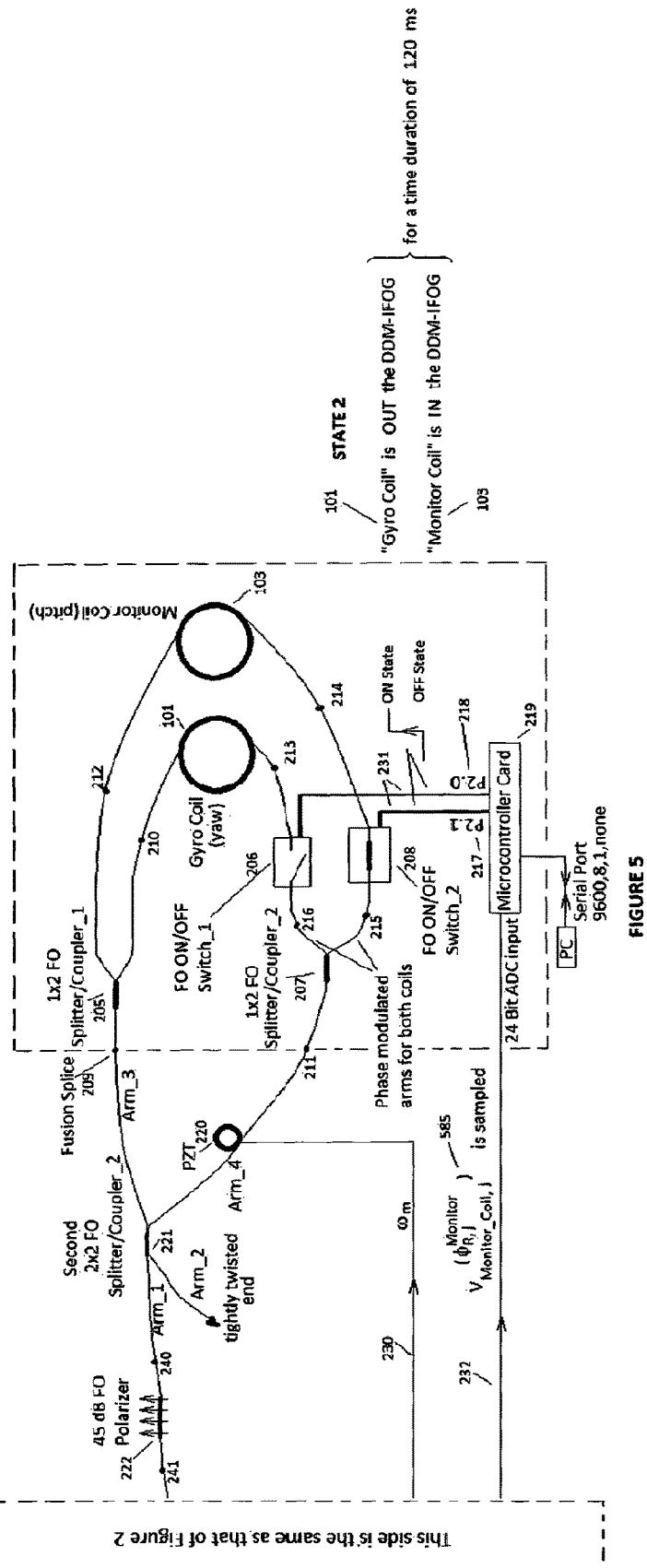
FIG. 5 shows the state of the DDM-IFOG depicted in FIG. 2, associated with FO switch controlled by a microcontroller card embedded with the software_2, when "Monitor Coil" is IN the IFOG for a 120 ms. The DDM-IFOG with "Monitor Coil" runs in monitoring and deriving the instantaneous drift of the DDM-IFOG having "Gyro Coil" under the influence of the angular e around z-axis (yaw). In this state, "Gyro Coil" is OUT the IFOG. The software_2 runs.

The exact correlation to derive the instantaneous drift parameter when "Gyro Coil" is IN the DDM-IFOG and yaw rotation continues at same time in the time domain defined as subscript "j" is constructed in Eq. (26) and (27). With the method presented in this invention, using $\bar{\gamma}$ 780, determined from the First Measurement stage and measuring $V_{Monitor\_Coil,j}(\emptyset_{R,j}^{Monitor})$ enable us to derive the instantaneous zero rotation voltage of the demodulation circuit 226 of the DDM-IFOG, corresponding to the instantaneous drift of the DDM-IFOG with "Gyro Coil" 101, containing the instantaneous drift $\emptyset_{d\_opt,j}^{Gyro\_Coil}$ associated with the variation on $A_{1,j}$, when the DDM-IFOG with "Gyro Coil" 101 is still rotating around z-axis (yaw). Instead of $V_{Gyro\_Coil,j}^{Drift}$ of the DDM-IFOG with "Gyro Coil" 101, $V_{Gyro\_Coil,j}^{Drift\_Derived}$ 687 of the DDM-IFOG with "Gyro Coil" 101 in Eq.(25) is monitored and derived with help of "Monitor Coil" 103. $V_{Gyro\_Coil,j}^{Drift\_Derived}$ is called as the derived instantaneous zero rotation voltage of the demodulation circuit 226 of the DDM-IFOG with "Gyro Coil" 101 any time t.

$$V_{Gyro\_Coil,j}^{Drift\_Derived} = \bar{\gamma} \cdot V_{Monitor\_Coil,j}(\emptyset_{R,j}^{Monitor}) \pm V_{off,j} \qquad (25)$$

Where $V_{Monitor\_Coil,j}(\emptyset_{R,j}^{Monitor})$ 585 is the output of the demodulation circuit 226 when "Monitor Coil" 103 is IN the DDM-IFOG through MEMS FO ON/OFF switch_2 228, which is the position in FIG. 5, and $V_{Monitor\_Coil,j}(\emptyset_{R,j}^{Monitor})$ 585 is sampled by the analog-to-digital converter of the microcontroller card 219 within 120 ms at the position of the FO ON/OFF switch_2 208, allowing the phase modulated counter propagating light wave to pass into "Monitor Coil", in FIG. 5. In ideal condition, describing full consistencies of both of the coils, $V_{Gyro\_Coil,j}^{Drift}$ in Eq. (24) should be equal to $\bar{\gamma} \cdot V_{Monitor\_Coil,j}(\emptyset_{R,j}^{Monitor})$ 585, based on the measurement data given in FIG. 3. Because the manufacturing and winding consistency between "Gyro Coil" and "Monitor Coil" isn't absolutely complete, and the presence of the minute differences and the variation of the longitudinal non-uniformities between both coils are inherent situations, the addition of a small correction offset value to $\bar{\gamma} \cdot V_{Monitor\_Coil,j}(\emptyset_{R,j}^{Monitor})$ such as $V_{off,j}$ 800 is necessary as in Eq.(25).

In this sequential and periodic process, the inclusion of "Monitor Coil" 103 for 120 ms, meaning the exclusion of "Gyro Coil" 101, can be downed to 1 ms or lower depending on the settling and sampling time of ADC used. $V_{Gyro\_Coil,j}^{Drift}$ in Eq.(25) can be written in terms of instantaneous optical drift $\emptyset_{d\_opt,j}^{Gyro\_Coil}$ with the correlation of the averaged "γ-correlation-coefficient" obtained from the time domain defined as subscript "i", showing the signalization 360 created by the software_1, previously determined by the sequential measurements carried out in the series of the First Measurement, $$V_{Gyro\_Coil,j}^{Drift} = A_{1,j} \sin(\emptyset_{d\_opt,j}^{Gyro\_Coil}) \cong$$
$$V_{Gyro\_Coil,j}^{Drift\_Derived} =$$
$$\bar{\gamma} \cdot V_{Monitor\_Coil,j}(\emptyset_{R,j}^{Monitor}) \pm V_{off,j} \qquad (26)$$

Eq.(26) and Eq.(27) can easily be written by substituting $V_{Gyro\_Coil,j}^{Drift\_Derived}$ 687 for $V_{Gyro\_Coil,j}^{Drift}$ due to Eq.(22) and Eq. (23).

$$V_{Gyro\_Coil,j}^{Drift\_Derived} = A_{1,j} \sin(\emptyset_{d\_opt,j}^{Gyro\_Coil}) = \qquad (27)$$
$$\left\{ \frac{1}{N} \sum_{i}^{N} \frac{A_{1,i} \sin(\emptyset_{d\_opt,i}^{Gyro\_Coil})}{B_{1,i} \sin(\emptyset_{d\_opt,i}^{Monitor\_Coil})} \right\} \cdot V_{Monitor\_Coil,j}(\emptyset_{R,j}^{Monitor}) \pm \bar{V}_{off}$$

$V_{Monitor\_Coil,j}(\emptyset_{R,j}^{Monitor})$ 585 is sampled within a duration of 120 ms by intervening "Monitor Coil" 103 of FIG. 5 through FO switch_2 208 after each 5400 ms duration of "Gyro Coil" 101 as in FIG. 5. The duration of 120 ms can be shortened depending on the settling and sampling time of the used ADC capability up to 1 ms or lower. This intervening of "Monitor Coil" 103 can be adjusted by either periodically or user defined style by means of the embedded software_2 developed. The time durations of "Monitor Coil" 103, and "Gyro Coil" 101 specified in this invention document are suitably selected for the technical requirements and the restrictions of the whole components of the DDM-IFOG system in the laboratory. The instantaneous real zero rotation rate voltage of the DDM-IFOG with "Gyro Coil" 101 ($V_{Gyro\_Coil,j}^{Drift}$) can be written in terms of $V_{Monitor\_Coil,j}(\emptyset_{R,j}^{Monitor}) = B_{1,j} \sin(\emptyset_{d\_opt,j}^{Monitor\_Coil})$ 585 sampled within 120 ms according to long term data presented in FIG. 3, because $A_{MC}$ 105 of "Monitor Coil" 103 is perpendicular to any angular rate direction exposing to $A_{GC}$ 100 of "Gyro Coil" 101 of the DDM-IFOG, $A_{MC}$ 105 of "Monitor Coil" 103 is perpendicular to $\Omega_z$ 110 ($A_{MC} \perp \Omega_z$), where $\Omega_z$ 110 shows the direction of the total angular induced by earth or by a servo system with respect to the direction of "Monitor Coil" 103 on x-axis (pitch). In spite of good flatness of "γ-correlation-coefficient" calculated in Eq. (21) it should be noted that the angular rate around z-axis (yaw) can be projected on the sensitive surface vector of $A_{MC}$ 105 of "Monitor Coil" 103, inherently, due to the consequence of the winding-based cosine loop error and location/position process. This angular rate projection around z-axis (yaw) on $A_{MC}$ 105 and other nonlinear factors caused by very minute structural, manufacturing and handling differences of the optical fiber coils used as "Monitor Coil" 103 and "Gyro Coil" 101 are characterized and included with an offset voltage, $\pm V_{off,j}$ 800. After the calculation of the derived instantaneous zero rotation voltage of the demodulation circuit 226 of the DDM-IFOG with "Gyro Coil" 101 any time t, $V_{Gyro\_Coil,j}^{Drift\_Derived}$ 687, with the correlation of $V_{Monitor\_Coil,j}(\emptyset_{R,j}^{Monitor})$, Eq. 19 can be re-written by using Eq. (26) as in Eq.(28) to be called The derived instantaneous demodulation voltage difference $\Delta V_j^{Derived}$ 900 herein. The derived instantaneous demodulation voltage difference, from which the instantaneous optical drift term $\emptyset_{d\_opt,j}^{Gyro\_Coil}$ is removed, is obtained as in Eq. (28). For best fit in the correlation given in Eq.(26) the use of higher degree polynomial functions is welcomed.

$$\Delta V_j^{Derived} = \{[A_{1,j}\sin(\emptyset_{R,j}^{Gyro\_Coil} + \emptyset_{d\_opt,j}^{Gyro\_Coil})] - [V_{Gyro\_Coil,j}^{Drift\_Derived}]\} \quad (28)$$

$$\Delta V_j^{Derived} = \{[A_{1,j}\sin(\emptyset_{R,j}^{Gyro\_Coil} + \emptyset_{d\_opt,j}^{Gyro\_Coil})] - [\bar{\gamma} \cdot V_{Monitor\_Coil,j}(\emptyset_{R,j}^{Monitor}) \pm \bar{V}_{off}]\} \quad (29)$$

$\bar{V}_{off}$ 780 is the averaged value of offset voltage to be calculated from the data set of subtraction of $\bar{\gamma} \cdot V_{Monitor\_Coil,j}(\emptyset_{R,j}^{Monitor})$ from $V_{Gyro\_Coil,j}^{Drift}$, which is the real instantaneous zero rotation rate voltage in Eq. (24).

$$\bar{V}_{off} = \frac{1}{M}\sum_j^M V_{off,j} 780.$$

M is the number of measurements to be done, and the subscript "j" shows the time domain of the series of the second measurement. Where $V_{Gyro\_Coil,j}^{Drift}$ is the real instantaneous zero rotation rate voltage of the demodulation circuit 226 of the DDM-IFOG with "Gyro Coil" 101, corresponding to instantaneous drift, and $\bar{\gamma} \cdot V_{Monitor\_Coil,j}(\emptyset_{R,j}^{Monitor})$ is the derived instantaneous zero rotation rate voltage of the DDM-IFOG with "Gyro Coil" 101 derived by means of "Monitor Coil" 103. The subtraction in Eq.(29) should give zero whenever zero rotation rate take places for both coils 101,103. The calculation of $\bar{V}_{off}$ 810 is given in The Flow of the First Part of the Second Measurement Series. If $\Delta V_j^{Derived}$ 900 is written in $D_j^{corr\_yaw}(\emptyset_{R,j}^{Gyro\_Coil})$ by considering Eq.(15), Eq.(30) is derived in terms of "Monitor Coil"'s instantaneous drift voltage.

$$D_j^{corr\_yaw}(\emptyset_{R,j}^{Gyro\_Coil}) = SF \cdot \Sigma_j\{A_{1,j}\sin(\emptyset_{R,j}^{Gyro\_Coil} + \emptyset_{d\_opt,j}^{Gyro\_Coil}) - \bar{\gamma} \cdot V_{Monitor\_Coil,j}(\emptyset_{R,j}^{Monitor}) \pm \bar{V}_{off}\} \cdot \Delta t_j \quad (30)$$

Besides the instantaneous optical drift of "Gyro Coil"101, $\emptyset_{d\_opt,i}^{Gyro\_Coil}$, at any time, as seen from Eq.(22), the variation of the optical power of $P_0$, corresponding to "Gyro Coil" 101 IN, is compensated by the predefined and the averaged value of γ-correlation-coefficient with the DM-IFOG associated with the method specified in this invention. That is, the drift (not only instantaneous optical drift $\emptyset_{d\_opt,j}^{Gyro\_Coil}$ but also the instantaneous variation on electrical scale factor $A_{1,j}$) of the DDM-IFOG with "Gyro Coil" 101 is monitored and derived by the term $\bar{\gamma} \cdot V_{Monitor\_Coil,j}(\emptyset_{R,j}^{Monitor}) \pm \bar{V}_{off}$ in Eq.(30). In order to see the compensation of the variation of the optical power ($P_0$), Eq.(30) is written in open form as follows by using Eq.(22) and $V_{Monitor\_Coil,j}(\emptyset_{R,j}^{Monitor}) = B_{1,j} \sin(\emptyset_{d\_opt,j}^{Monitor\_Coil})$ 585;

$$D_j^{corr\_yaw}(\emptyset_{R,j}^{Gyro\_Coil}) = SF \cdot \sum_j \left\{ A_{1,j}\sin(\emptyset_{R,j}^{Gyro\_Coil} + \emptyset_{d\_opt,j}^{Gyro\_Coil}) - \left\{\frac{1}{N}\sum_i^N \frac{A_{1,i}\sin(\emptyset_{d\_opt,i}^{Gyro\_Coil})}{B_{1,i}\sin(\emptyset_{d\_opt,i}^{Monitor\_Coil})}\right\} \cdot B_{1,j} \sin(\emptyset_{d\_opt,j}^{Monitor\_Coil}) \pm \bar{V}_{off} \right\} \cdot \Delta t_j \quad (31)$$

According to Eq. (31), the demodulation voltage of "Monitor Coil" $V_{Monitor\_Coil,j}(\emptyset_{R,j}^{Monitor})$ 585, sampled within a duration of 120 ms after completion of duration of 5400 ms when "Gyro Coil" 101 is IN the DDM-IFOG, is composed of $B_{1,j}$ electrical scale factor and $\emptyset_{d\_opt,j}^{Monitor\_Coil}$. Therefore the amplitude of the instantaneous optical drift of "Gyro Coil" 101, defined as electrical scale factor ($A_{1,j}$), in Eq. (19) is being compensated with the term $$\left\{\frac{1}{N}\sum_i^N \frac{A_{1,i}}{B_{1,i}}\right\} B_{1,j}$$

in Eq. (31) presented in this invention.

SF of the DDM-IFOG in this invention, the full illustration of which is depicted in FIG. 2, is ~18.02 (°/h)/mV) for "Gyro Coil" 101 and the new voltage value $\Delta V_j^{Derived}$ 900. When $\emptyset_R^{Gyro\_Coil} = A_{GC} \cdot \Omega_z = 0$, the typical and the characteristic long term drift of the DDM-IFOG with "Gyro Coil" 101 via Allan Variance, collected from the Eq.(11), is around 3.72°/h over 1 hour average obtained from 3600 voltage data.

The Series of the Second Measurement

This section is composed of two parts. The first part covers items 1-9, determining the offset voltage $\bar{V}_{off}$ 810 when $A_{GC}$ 100 is perpendicular to $\Omega_{Earth}$ 712 ($A_{GC} \perp \Omega_{Earth}$), at same time that $A_{MC}$ 105 is inherently perpendicular to $\Omega_{Earth}$ 712 ($A_{MC} \perp \Omega_{Earth}$) due to the coil placements in the DDM-IFOG shown in this invention. The second part covers monitoring and deriving of the instantaneous drift, corresponding to in real time when the DDM-IFOG continues rotating according to several $A_{GC}$ 100 orientations of "Gyro Coil" 101.

The Flow of the First Part of the Second Measurement Series
By following the 10$^{th}$ item of Flow of the First Measurement Series:

1 After entering $\bar{\gamma}$ 780 in the embedded software_2 developed peculiarly for this invention, the initial value of $\bar{V}_{off}$ 810 is entered in the software_2 as a zero (0). The software_2 embedded in the microcontroller card 219 is run when the DDM-IFOG is still operating its rated optical power value stabilized with the help of stabilization circuit. "Gyro Coil" (yaw axis) is inclined from North to South as 40.8°, which is the latitude of Gebze TURKEY, to prevent the Earth rotation rate projection.

Figure 4:
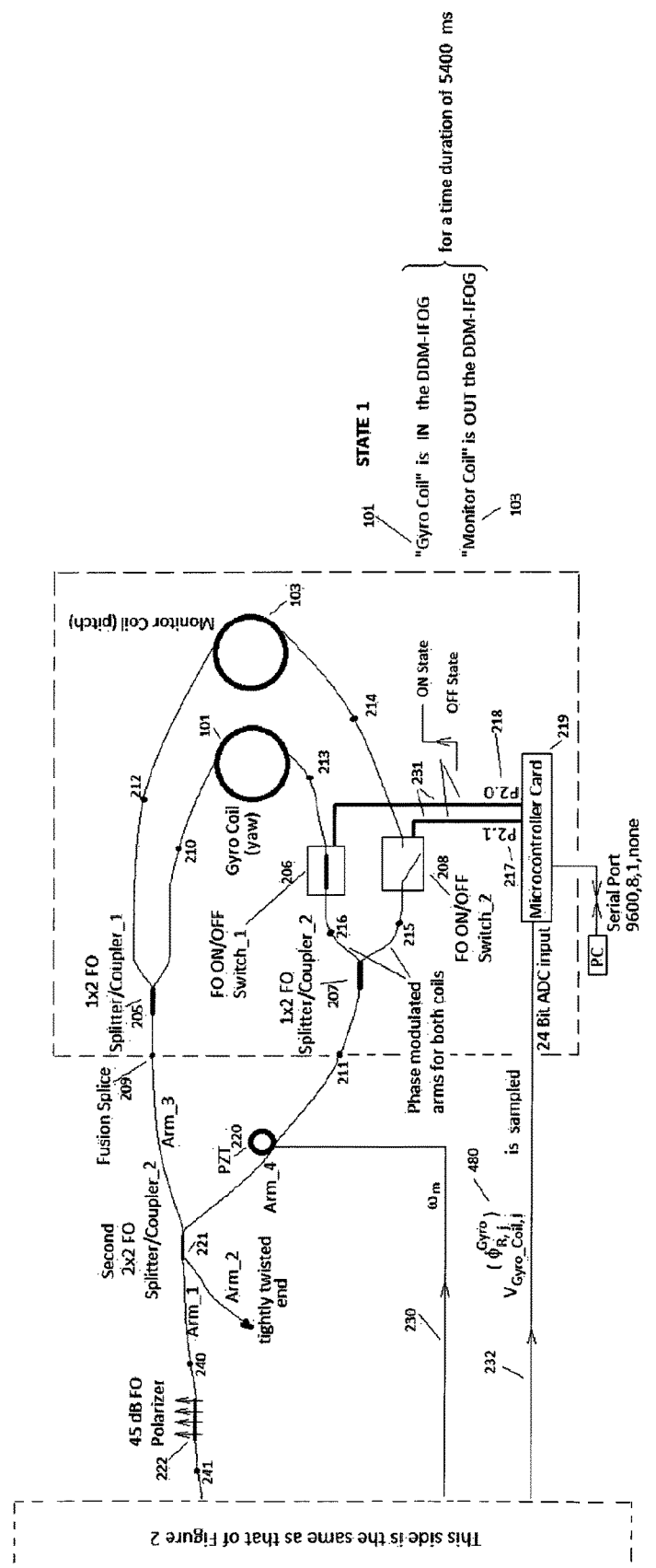
FIG. 4 shows the state of the DDM-IFOG depicted in FIG. 2, associated with FO switch controlled by the microcontroller card embedded with the software_2, when "Gyro Coil" is IN the DDM-IFOG for a 5400 ms. The DDM-IFOG runs in its normal operation to detect the angular rate around z-axis (yaw). This state "Monitor Coil" is OUT the IFOG. The software_2, named as, "Gyro_CompensationMain.c", runs.

2 In the orientation of the sensitive surface vector $A_{GC}$ 100 of "Gyro Coil" 101 perpendicular to $\Omega_{Earth}$ 712 causing $\emptyset_{R,j}^{Gyro\_Coil} = 0$, the sensing surface vector $A_{MC}$ 105 of "Monitor Coil" 103 in FIG. 2 shows still East-West direction and there is also no angular rate projection based on Earth rotation on "Monitor Coil" 103 in FIG. 2 because of perpendicularity of $A_{MC}$ 105 to $\Omega_{Earth}$ 712. The software_2 supplies with the signalization 660 given in FIG. 6. This signalization 660 is different from the previous signalization 360 given in FIG. 3. According to the signalization 660 in the second measurement, when "Gyro Coil" 101 is IN the DDM-IFOG, "Monitor Coil" 103 is OUT the DDM-IFOG for 5400 ms as seen in FIG. 4. The current condition of the MEMS FO ON/OFF switch_1 206 is shown in FIG. 4 $V_{Gyro\_Coil,j}(\emptyset_{R,j}^{Gyro\_Coil}) = A_{1,j}\sin(\emptyset_{d\_opt,j}^{Gyro\_Coil})$ 480 in Eq.(24) is sampled by the analog-to-digital converter of the microcontroller card 219 within 5400 ms.

3 After ending of 5400 ms, "Gyro Coil" 101 of in FIG. 2 is OUT the DDM-IFOG and "Monitor Coil" 103 of in FIG. 2 is IN for 120 ms as seen in FIG. 5 by the software_2 in order to monitor and derive the instantaneous zero rotation rate voltage of the demodulation circuit 226 of the DDM-IFOG with "Gyro Coil" 101 $V_{Monitor\_Coil,j}$ ($\emptyset_{R,j}^{Monitor}$) 585 is sampled through the analog-to-digital converter of the microcontroller card 219 within 120 ms in FIG. 5.

4 "Monitor Coil" 103 generates $V_{Monitor\_Coil,j}$ ($\emptyset_{R,j}^{Monitor}$)=$B_{1,j}$ $\sin(\emptyset_{d\_opt,j}^{Monitor\_Coil})$ 585 due to $\emptyset_{R,j}^{Monitor}$=$A_{MC} \cdot \Omega_z$=0, and $A_{MC}$ 105 is laying on East-West direction (pitch).

5 After completion of sampling $V_{Monitor\_Coil,j}$ ($\emptyset_{R,j}^{Monitor}$)=$B_{1,j}$ $\sin(\emptyset_{d\_opt,j}^{Monitor\_Coil})$ 585, $V_{Monitor\_Coil,j}(\emptyset_{R,j}^{Monitor})$ 585 is multiplied by $\bar{\gamma}$ 780 by means of the software_2 and $\bar{\gamma} \cdot V_{Monitor\_Coil,j}(\emptyset_{R,j}^{Monitor})$ is automatically calculated by the software_2.

6 And then the instantaneous drift of "Gyro Coil" 585 derived by $\bar{\gamma} \cdot V_{Monitor\_Coil,j}(\emptyset_{R,j}^{Monitor})$ is subtracted from the real drift of the DDM-IFOG with "Gyro Coil" $V_{Gyro\_Coil,j}(\emptyset_{R,j}^{Gyro\_Coil})$=$A_{1,j}$ $\sin(\emptyset_{d\_opt,j}^{Gyro\_Coil})$ 480 obtained as item 2 of this part.

7 This subtraction corresponds to $V_{off,j}$=$V_{Gyro\_Coil,j}(\emptyset_{R,j}^{Gyro\_Coil})$−$\bar{\gamma} \cdot V_{Monitor\_Coil,j}(\emptyset_{R,j}^{Monitor})$ 800 and finally Eq.(27) and (28) are fully completed. This is the offset voltage, $V_{off}$, which should be close to zero for best suitable $\bar{\gamma}$ 780. Averaged $\nabla_{off}$ 810 is calculated from the number of collected data in the following $$\bar{V}_{off} = \frac{1}{M}\sum_{j}^{M} V_{off,j} 810.$$

Number of measurements M depends on the executer. Larger data ensures the correctness of $\nabla_{off}$ 810.

8 $\bar{\gamma}$=1.06511 780 and $\nabla_{off}$=−0.0041981 (mV) 810 are the typical values for the DDM-IFOG, sated as preferred embodiment. With this offset value, the demodulation voltages obtained separately from "Gyro Coil" 101 and "Monitor Coil" 103 are fully matched and resultantly, zeroed when there is no angular rate projection on both coils for the new signalization process created by the software_2.

9 After completion of entering $\nabla_{off}$=−0.0041981 (mV) 810 in the software_2 instead of a zero (0) initial value, both coils 101, 103 are taken into laboratory latitude.

The Flow of the Second Part of the Second Measurement Series

By addressing the following "Gyro Coil" 101 orientations located on laboratory latitude, the following parts should be put into process as active areas of use of the DDM-IFOG in the invention:

i-) If $A_{GC}$ of the DDM-IFOG in this invention is settled as parallel to $\Omega_{Earth}$ 112, $A_{MC}$ 105 is perpendicular to $\Omega_{Total}$. Where $\Omega_{Total}$=$\Omega_{Earth}$+$\Omega_z$ which shows a vectorial sum, total yaw rotation and $\Omega_z$ 110 is the yaw rotation rate externally applied to "Gyro Coil" 101, which is to be used in SF calibration of the DDM-IFOG by a servo motor system—The use of the DDM-IFOG in precise and accurate Scale Factor (SF) determinations.

ii-) If $A_{GC}$ 100 of the DDM-IFOG presented in this invention is settled on the laboratory latitude, $A_{MC}$ 105 is perpendicular to $\Omega_{Earth}$ 712 and its projection is 9.83°/h.—Finding the True North via the DDM-IFOG in the invention When Earth Rotation Plus Externally Applied Rotation ($\Omega_z$ 110) Influence the DDM-IFOG (Coil Orientations Stated Just Above, Item i).

This section covers to monitor and determine the derived instantaneous zero rotation voltage of the demodulation circuit 226 of the DDM-IFOG with "Gyro Coil" 101 presented in the invention in precise and accurate determination of Scale Factor (SF).

Figure 6:
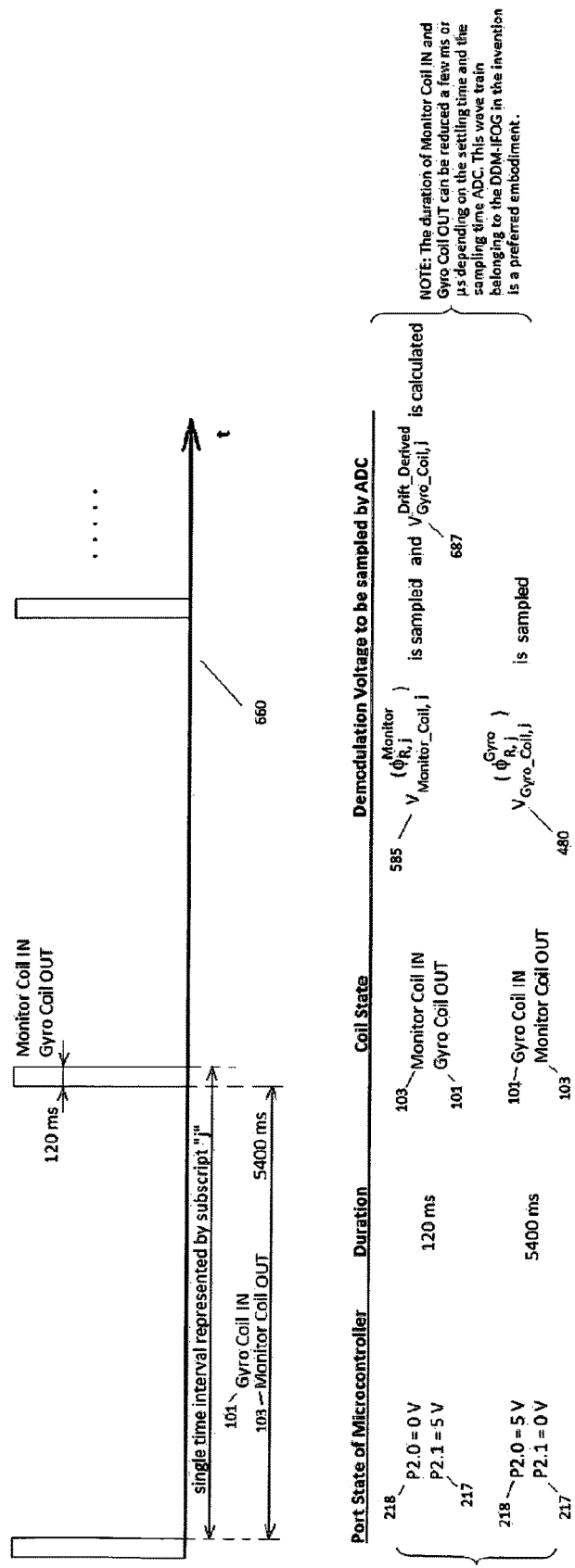
FIG. 6 shows the timing of the sequential switching of "Gyro Coil" and "Monitor Coil" by means of the microcontroller card including C based-embedded software_2 controlling synchronously built-in an analog-to-digital converter, which samples the demodulation outputs belonging to "Gyro Coil" and "Monitor Coil".
Figure 7:
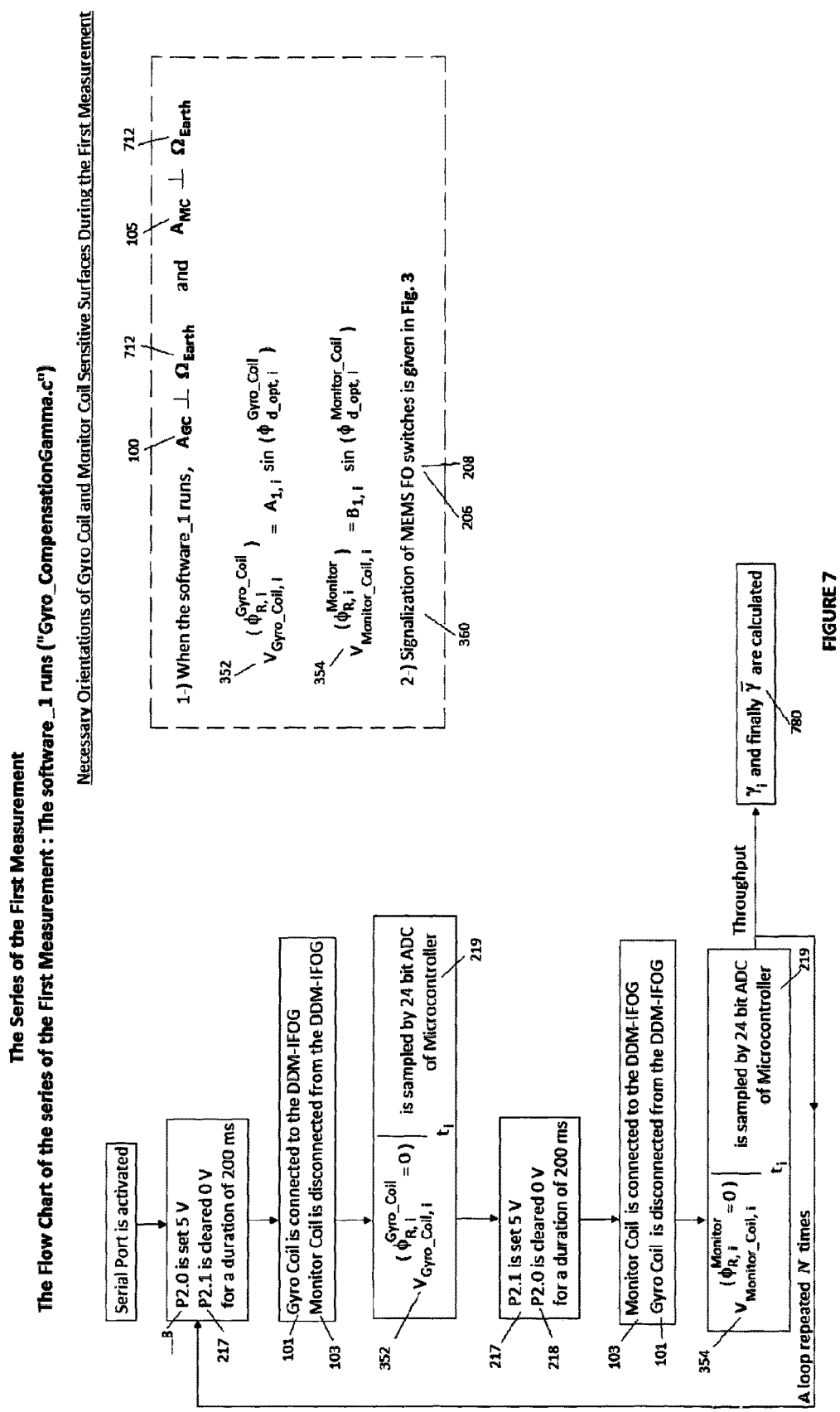
FIG. 7 shows the flow diagram of the software_1 ("Gyro_CompensationGamma.c"), calculating an averaged correlation-coefficient. When the software_1 is running, "Gyro Coil" is so located that $A_{GC}$ is perpendicular to Earth rotation axis and so $A_{MC}$ is also perpendicular to $\Omega_{Earth}$. The area drawn by the dashed lines doesn't include in the flow chart of the software_1.
Figure 8:
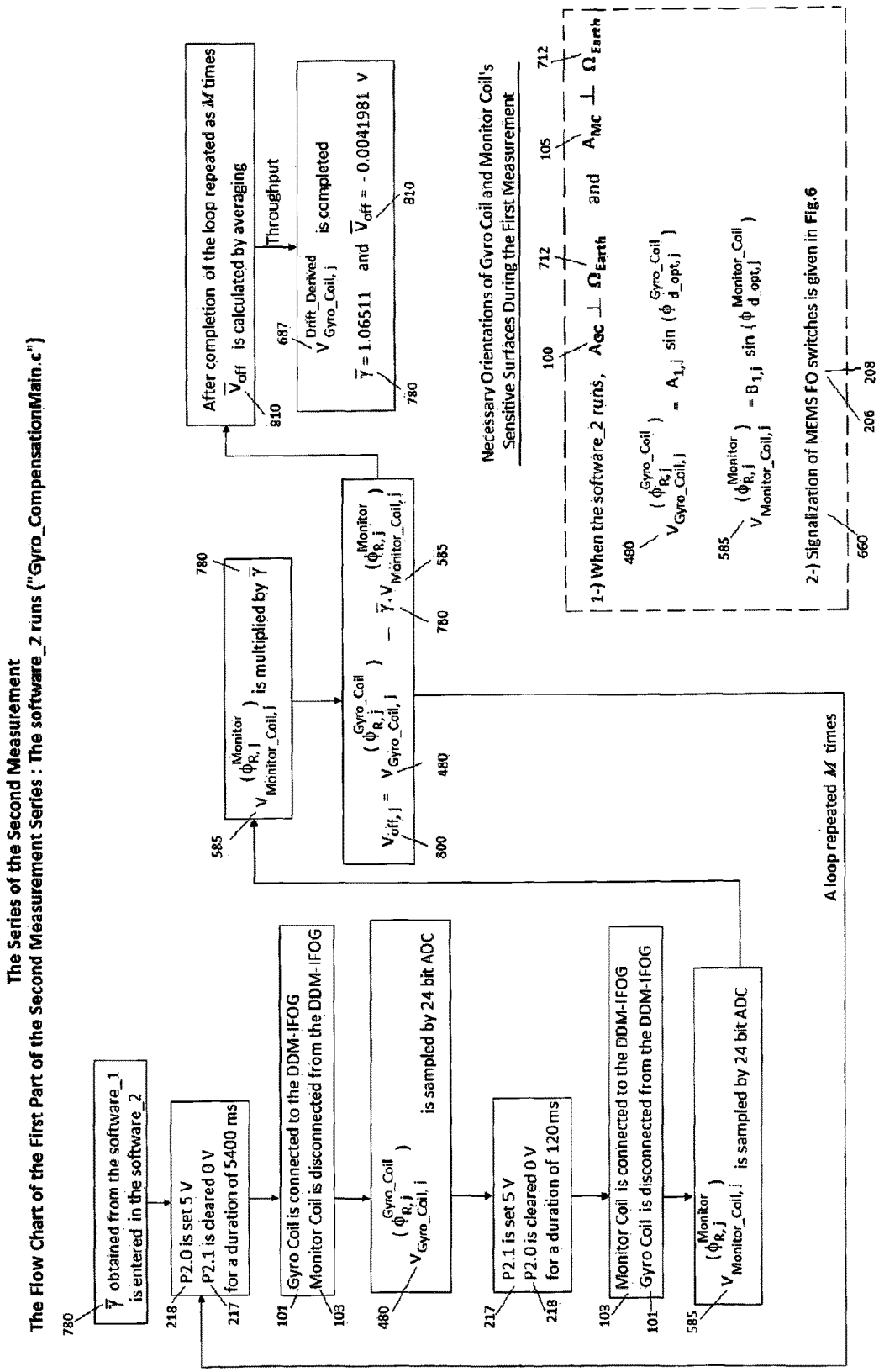
FIG. 8 shows the Flow Chart of the First Part of the Second Measurement Series, the software_2 ("Gyro_CompensationMain.c"). The flow of the software_2 is composed of two parts. The first part covers to determine the offset voltage $V_{off,j}$ and finally $\overline{V}_{off}$ between the drift of the DDM-IFOG with "Gyro Coil", corresponding to the real zero rotation voltage, and the derived drift voltage of IFOG having "Monitor Coil", When "Gyro Coil" and "Monitor Coil" are still perpendicular to Earth rotation ($\Omega_{Earth}$) axis. The area drawn by the dashed lines doesn't include in the flow chart of the software_2.
Figure 9A:
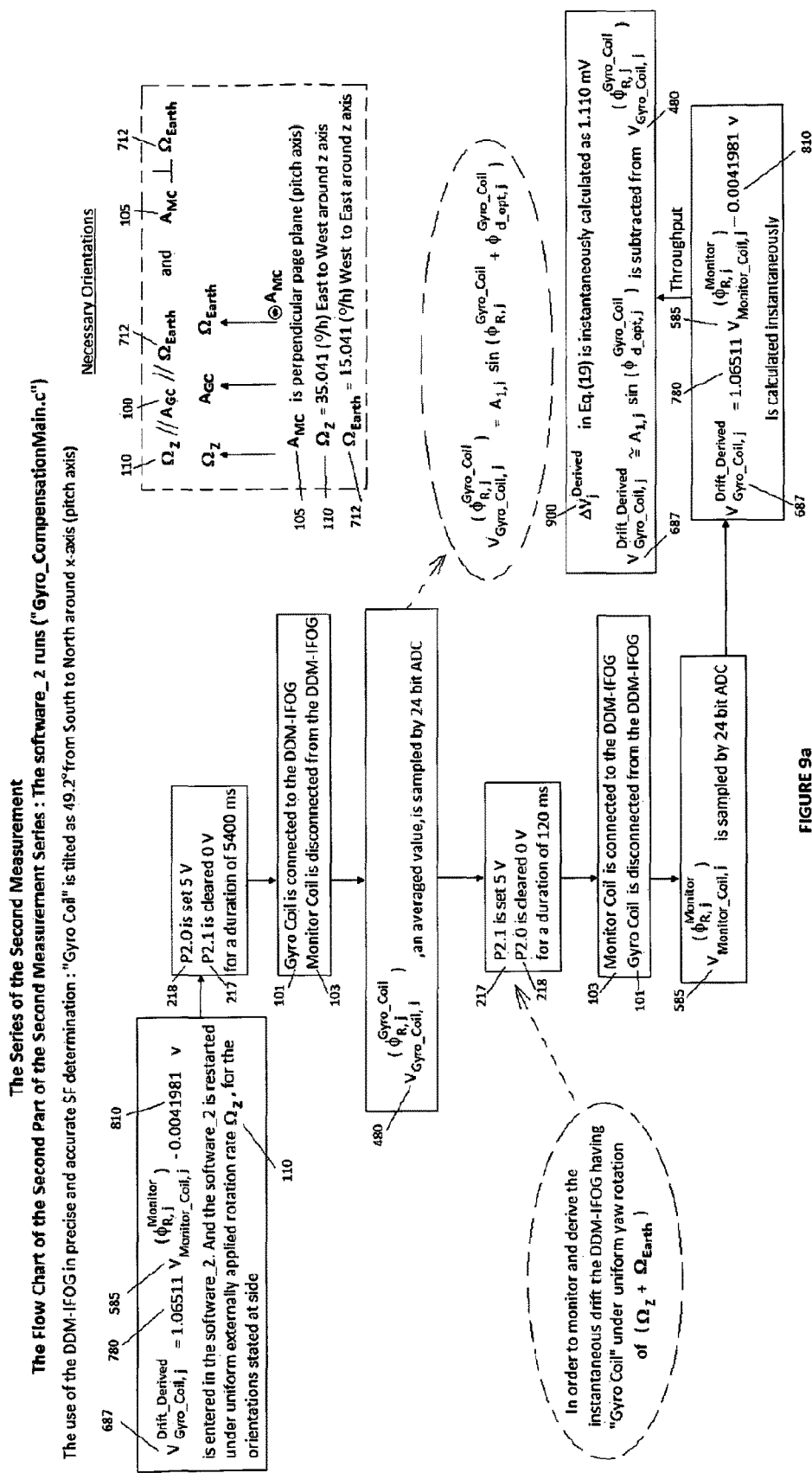
FIG. 9a. shows the Flow Chart of the Second Part of the Second Measurement Series, the software_2, covers to monitor and derive the instantaneous drift in real time when the DDM-IFOG with "Gyro Coil" continues rotating on the parallel orientation to Earth rotation axis under continuously and externally applied rotation rate ($\Omega_z$). Precise and accurate Scale Factor (SF) determination with the DDM-IFOG in the invention. The area drawn by the dashed lines doesn't include in the flow chart of the software_2.
Figure 9B:
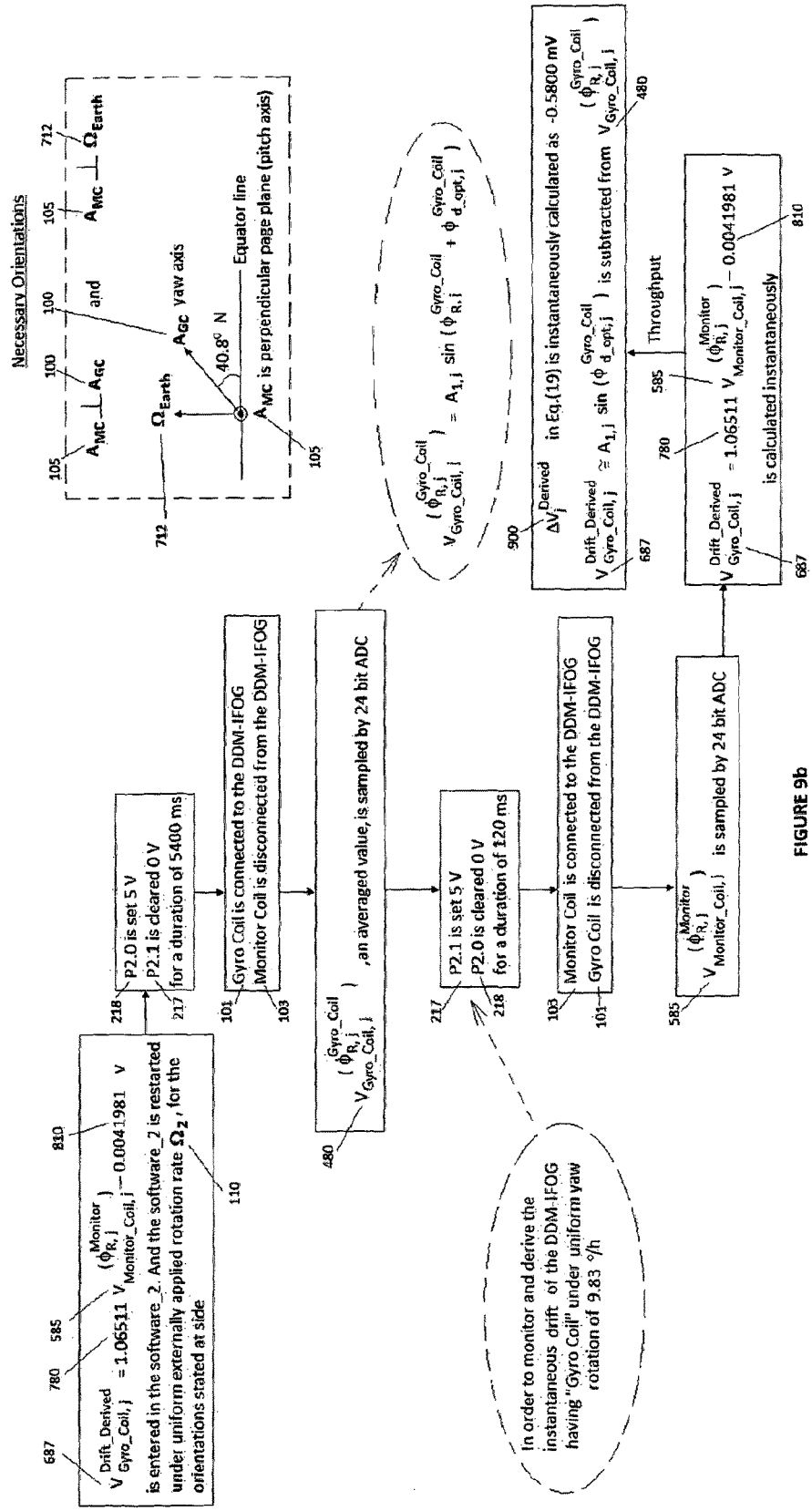
FIG. 9b. shows the Flow Chart of the Second Part of the Second Measurement Series, the software_2, covers to monitor and derive the instantaneous drift in real time when the DDM-IFOG with "Gyro Coil" continues rotating on the laboratory latitude. Finding the True (Geographic) North via the DDM-IFOG in the invention. The area drawn by the dashed lines doesn't include in the flow chart of the software_2.

10 By following item 9, the software_2, generating the signalization 660 in FIG. 6, continues running. Setting P2.0 218 to 5 V, and synchronously clearing P2.1 217 by the software_2, MEMS FO ON/OFF switch_1 206 links "Gyro Coil" 101 to the DDM-IFOG and MEMS FO ON/OFF switch_2 208 separate "Monitor Coil" 103 from the DDM-IFOG in FIG. 4. That is, "Gyro Coil" 101 is IN and "Monitor Coil" 103 is OUT the DDM-IFOG for 5400 ms. In this configuration, $V_{Gyro\_Coil,j}(\emptyset_{R,j}^{Gyro\_Coil})$=$[A_{1,j}$ $\sin(\emptyset_{R,j}^{Gyro\_Coil}+\emptyset_{d\_opt,j}^{Gyro\_Coil})]$ 480 in Eq.(11), corresponding to the first side of Eq.(29), is sampled by the analog-to-digital converter of the microcontroller card 219 in real time.

11 The latitude of the DDM-IFOG settled is on 40.8° N, Gebze/TURKEY. The projected angular rate of Earth rotation of 15.041 (°/h) west to east on the sensitive surface vector $A_{GC}$ 100 of "Gyro Coil" 101 is cos (90°−40.8°) 15.041(°/h)=9.83 (°/h) from west to east. Now "Gyro Coil" 101 is under influence of uniform 9.83 (°/h) from west to east.

12 In order to zero this rate projection on $A_{GC}$ 100, "Gyro Coil" 101 is inclined 90°−40.8°=49.2° from South to North, corresponding to a rotation angle of 49.2° around x-axis (pitch). This inclination is applied once. Axis of Earth rotation coincide the axis of "Gyro Coil" 101 and "Monitor Coil" 103 of the DDM-IFOG in FIG. 1. After completion of the process of the coinciding, when "Monitor Coil" 103 shows East-West direction (pitch), "Gyro Coil" shows North-South direction (yaw). In this case, a continuous yaw rotation (around z-axis) can be applied to the DDM-IFOG because the perpendicularity of $A_{MC}$ of "Monitor Coil" 103 to both Earth rotation axis (yaw) and the additional rotation direction (yaw) to be applied to "Gyro Coil" 101 is guaranteed with this inclination of 49.2° from South to North, and the rotation of the DDM-IFOG around z-axis doesn't create any angular rate projection on $A_{MC}$ 103. When an additional and external rotation rate of $\Omega_z$≅35.041 (°/h) east to west around z axis (yaw rotation) by servo motor is applied by the servo motor system to the DDM-IFOG, a SPS is inside "Gyro Coil" 101, not inside "Monitor Coil" 103 on x-axis (pitch) for total angular rate of 35.041°/h (east to west) minus 15.041°/h (west to east) $\Omega_{Total}$≅20.00°/h, east to west. Therefore the demodulation voltage for a total yaw rotation rate of 20.00°/h east to west on $A_{GC}$ 100, is composed of $V_{Gyro\_Coil,j}(\emptyset_{R,j}^{Gyro\_Coil})$=$[A_{1,j}$ $\sin(\emptyset_{R,j}^{Gyro\_Coil}+\emptyset_{d\_opt,j}^{Gyro\_Coil})]$ 480 in Eq.(11), corresponding to the first side of Eq.(29), is sampled by the analog-to-digital converter for a duration of 5400 ms in real time. The positions of MEMS FO Switches 206,208 are given in FIG. 4. Where $\emptyset_{R,j}^{Gyro\_Coil}$ is the function of $\Omega_{Total}$≅20.00°/h, east to west, total yaw rotation.

13 In this case, it is seen that $V_{Gyro\_Coil,j}(\emptyset_{R,j}^{Gyro\_Coil})$ 480 is equal to 1001.110 mV, induced by a total yaw rotation rate of $\Omega_{Total}$≅20.00°/h, east to west, and which is an averaged value obtained from the demodulation voltage data sampled by the analog-to-digital converter within 5400 ms.

14 At the end of 5400 ms, in order to monitor, and determine the derived instantaneous zero rotation voltage of the demodulation circuit 226 of the DDM-IFOG with "Gyro Coil" 101 under continuously uniform rotation rate of 20.00 (°/h) east to west, P2.1 217 is set to 5 V, and P2.0 218 is cleared by the software_2 synchronously MEMS FO ON/OFF switch_2 208 links "Monitor Coil" 103 to the DDM-IFOG circuit and MEMS FO ON/OFF switch_1 separate "Gyro Coil" 101 from the DDM-IFOG circuit in FIG. 5 for 120 ms. With these positions of switches 217,218, $V_{Monitor\_Coil,j}(\emptyset_{R,j}^{Monitor})= B_{1,j}\sin(\emptyset_{d\_opt,j}^{Monitor\_Coil})$ 585 is sampled by the analog-to-digital converter of microcontroller card 219 for 120 ms.

15 The voltage $V_{Monitor\_Coil,j}(\emptyset_{R,j}^{Monitor})$ 585 obtained at the end of 120 ms is multiplied by $\bar{\gamma}=1.06511$ 780 and summed with $\nabla_{off}=-0.0041981$ (mV) 810 by the software_2. The derived instantaneous zero rotation voltage of the demodulation circuit 226 of the DDM-IFOG with "Gyro Coil" 101 any time t is $V_{Gyro\_Coil,j}^{Drift\_Derived}=[\bar{\gamma}\cdot V_{Monitor\_Coil}(\emptyset_{R,j}^{Monitor})\pm \nabla_{off}]$ 687 in Eq. (27). Resultantly, the derived instantaneous voltage difference $\Delta V_j^{Derived}$ 900 in Eq.(28) and (29), corresponding to the net yaw angular displacement $D_j^{yaw}$, is $\Delta V_j^{Derived}=\{[A_{1,j}\sin(\emptyset_{R,j}^{Gyro\_Coil}+\emptyset_{d\_opt,j}^{Gyro\_Coil})]-[V_{Gyro\_Coil,j}^{Drift\_Derived}]\}\cong 1.110$ mV 900.

Now that the term $A_1^0\sin(\emptyset_{d\_opt,j}^{0\_Gyro\_Coil})$, which Allan Variance relates to $A_{1,j}\{\sin(\emptyset_{d\_opt,j}^{Gyro\_Coil})$ as a variant, is dropped from $D_j^{corr\_yaw}$ with this method because instantaneous zero rotation rate voltage of the DDM-IFOG with "Gyro Coil" 101 can be derived with a secondary ("Monitor Coil") in expense of separating "Gyro Coil" 101 from the DDM-IFOG circuit without disturbing the orientation of $A_{GC}$ 100 of "Gyro Coil" 101 within as short time (120 ms). The first side of $\Delta V_j^{Derived}$ 900 just above is $A_{1,j}\sin(\emptyset_{R,j}^{Gyro\_Coil}+\emptyset_{d\_opt,j}^{Gyro\_Coil})$ and was obtained from item 12 of this part.

16 Time duration of 120 ms, showing that "Gyro Coil" 101 is OUT and "Monitor Coil" 103 is IN the DDM-IFOG, can be reduced to µs orders, depending on the time constant of the demodulation circuit together low pass filter at its output layer, ADC's settling and sampling times, ADC's bit size, and the machine cycle of microcontroller card. In this patent application, several time durations have been used. There is no necessity of periodicity to apply the signalizations 360,660 depicted in FIG. 3, and FIG. 6. The timing of the linking of "Monitor Coil" 103 to the DDM-IFOG circuit can be determined by executer/implementer/software personnel, compatible with the system requirements and restrictions. The frame of this invention covers the other timings and is the valid for other timing and signaling types of "Monitor Coil" 103 and "Gyro Coil" 101 values definitely.

17 When the net yaw rotation on the sensitive surface vector $A_{GC}$ 100 of "Gyro Coil" 101, is 20.00 (°/h), the voltage variations on the derived instantaneous zero rotation rate voltage of DDM-IFOG with "Gyro Coil" 101, $V_{Gyro\_Coil,j}^{Drift\_Derived}$ 687, by putting "Monitor Coil" 103 into process for 120 ms instead of "Gyro Coil" 101, is around 0.400 mV because the yaw angular rate of 20.00°/h applied to the IFOG creates an angular rate projection on the sensitive surface vector $A_{MC}$ 105 of "Monitor Coil" 103 on the pitch axis unavoidably due to geometric and structural properties of sensing coils like winding, the disturbance of fixing components, on eccentricity of mounting shafts of the sensing coils 101,103. The randomly voltage variations on the derived instantaneous zero rotation rate voltage of DDM-IFOG with "Gyro Coil" 101, $V_{Gyro\_Coil,j}^{Drift\_Derived}$ 687, of 0.350 mV corresponds to a peak value of ~6.30 (°/h).

The peak variation of the DDM-IFOG having "Gyro Coil" 101 is ~6.30 (°/h) and the long term drift is 3.72°/h calculated by considering $V_{Gyro\_Coil}(\emptyset_{R,j}^{Gyro\_Coil})$ 480 only via Allan Variance method. However the DDM-IFOG has a long term drift of ~1.20°/h because the voltage corresponding to SPS $\emptyset_{R,j}^{Gyro\_Coil}$ is now $\Delta V_j^{Derived}$ 900 in Eq.(29), not $V_{Gyro\_Coil}(\emptyset_{R,j}^{Gyro\_Coil})$ 480 anymore in Eq.(11) or (12). This is one an important results of this invention!

18 According to the experimental result introduced at the end of item 17, the bias stability (or drift) is enhanced better than one third of the previous value (3.72°/h). Dynamic range of the DDM-IFOG for the integrated optical power of ~600 µW of SLED 228 is $\Delta V_j^{Derived} \cong \pm 1800$ mV 900.

19 Another important and additional contribution for the mentioned voltage variations arises from the optical power repeatability values varying from 0.025 dB to 0.05 dB of MEMS FO ON/OFF switches in FIG. 2, FIG. 4 and FIG. 5. The contribution of the repeatability of 0.025 dB-0.050 dB of any of MEMS FO ON/OFF switches 206,208 to the voltage variations appearing on the derived instantaneous zero rotation rate voltage $V_{Gyro\_Coil,j}^{Drift\_Derived}$ 687 of DDM-IFOG with "Gyro Coil" 101, calculated by help of "Monitor Coil" 103, is around an order of 0.006 mV to 0.011 mV, corresponding to a drift range extending from 0.11 (°/h) to 0.20 (°/h). These calculated values are beyond the detection limit of the DDM-IFOG in the invention.

The process of orienting the axes of the DDM-IFOG parallel to Earth rotation axes given in item 12 is necessary for the DDM-IFOG, the sensitivity of which is sufficient to sense an angular rate of a few °/h. Otherwise, the rotation of the DDM-IFOG located on laboratory latitude with an angular rate externally applied by a servo motor system in addition to Earth rotation begins to create the angular rate projection on $A_{MC}$ 103 because the pitch orientation of "Monitor Coil" 103 begins to go to y-axis (roll axis). In order to avoid this error, the inclination of "Gyro Coil" of 49.2° from South to North should be applied for the DDM-IFOG able to sense the angular rate of a few °/h in that the validity of the method and the DDM-IFOG configuration presented in this invention is maintained. This orientation of the coils shown in this section and the method is used in SF calibration of the DDM-IFOG. $\Omega_z$ 110 is the calibration rotation rate externally applied to "Gyro Coil" 101 in parallel (yaw axis)

When Earth Rotation Influences the DDM-IFOG Only on the Laboratory Latitude (Coil Orientations Stated Just Above, Item ii).

The below process of finding the true (geographic) north via the DDM-IFOG, which belongs to determining the derived instantaneous zero rotation voltage of the DDM-IFOG with "Gyro Coil" 101 under continuously uniform rotation rate projected on the laboratory latitude by means of $V_{Monitor\_Coil,j}(\emptyset_{R,j}^{Monitor}=0)$ 585, is carried out when the DDM-IFOG is settled on the laboratory latitude of 40.8° N. That is, no additional and external angular rate application to the DDM-IFOG other than Earth rotation;

20 When $A_{GC}$ 100 of "Gyro Coil" 101 of the DDM-IFOG is on 40.8° N, $A_{MC}$ 105 of "Monitor Coil" 103 keeps its perpendicularity with respect to Earth rotation axis because $A_{MC}$ 105 still lies East-West direction.

21 The projection of Earth rotation of 15.041 (°/h) west to east on the sensitive surface vector $A_{GC}$ 100 of "Gyro Coil" 101, is cos (90°−40.8°) 15.041(°/h)=9.83 (°/h) from west to east. Now "Gyro Coil" 101 is under influence of uniform 9.83 (°/h) from west to east.

22 Therefore the demodulation voltage for a net yaw rotation rate of 9.83°/h, east to west on $A_{GC}$ 100 is composed of $V_{Gyro\_Coil,j}(\emptyset_{R,j}^{Gyro\_Coil})=[A_{1,j}\sin(\emptyset_{R,j}^{Gyro\_Coil}+\emptyset_{d\_opt,j}^{Gyro\_Coil})]$ 480 in Eq.(11), corresponding to the first side of Eq.(29), is sampled by the analog-to-digital converter of the microcontroller card 219 for a duration of 5400 ms in real time. $\emptyset_{R,j}^{Gyro\_Coil}$ is the function of 9.83 (°/h) from west to east, total yaw rotation. Where the axis defined as yaw axis is parallel to $A_{GC}$ 100 on laboratory latitude and $\emptyset_{R,j}^{Gyro\_Coil}$ is the function of $\Omega_{Total} \cong 9.83°/h$, west to east, which is total yaw rotation. The positions of MEMS FO Switches 206,208 are given in FIG. 4.

23 In this case, it is seen that $V_{Gyro\_Coil,j}(\emptyset_{R,j}^{Gyro\_Coil})$ 480 is equal to ~999.40 mV, induced by a total yaw rotation rate of 9.83 (°/h), west to east and which is an averaged value obtained from the demodulation voltage data sampled by the analog-to-digital converter of the microcontroller card 219 for a duration of 5400 ms.

24 At the end of 5400 ms, in order to monitor, and determine the derived instantaneous zero rotation voltage of the DDM-IFOG with "Gyro Coil" 101 under continuously uniform yaw rotation rate of 9.83 (°/h) from west to east, P2.1 217 is set to 5 V, and P2.0 218 is cleared by the software_2 synchronously MEMS FO ON/OFF switch_2 208 links "Monitor Coil" 103 to the DDM-IFOG circuit and MEMS FO ON/OFF switch_1 206 separate "Gyro Coil" 101 from the DDM-IFOG circuit in FIG. 5 for 120 ms. With these positions of switches 206,208, $V_{Monitor\_Coil,j}(\emptyset_{R,j}^{Monitor}=0)=B_{1,j}\sin(\emptyset_{d\_opt,j}^{Monitor\_Coil})$ 585 is sampled by the analog-to-digital converter of microcontroller card 219 for 120 ms.

25 The voltage $V_{Monitor\_Coil,j}(\emptyset_{R,j}^{Monitor}=0)$ 585 obtained at the end of 120 ms is multiplied by $\bar{\gamma}=1.06511$ 780 and summed with $\nabla_{off}=-0.0041981$ (mV) 810 by the software_2. The derived zero rotation rate voltage corresponding to the instantaneous drift of the DDM-IFOG with "Gyro Coil" 101 is $V_{Gyro\_Coil,j}^{Drift\_Derived}=[\bar{\gamma} \cdot V_{Monitor\_Coil,j}(\emptyset_{R,j}^{Monitor}=0) \pm \nabla_{off}]$ 687 in Eq.(27). The derived instantaneous voltage difference $\Delta V_j^{Derived}$ in Eq.(28) and (29), corresponding to the corrected net yaw angular displacement $D_j^{corr\_yaw}$, is $\Delta V_j^{corr}=\{[A_{1,j}\sin(\emptyset_{R,j}^{Gyro\_Coil}+\emptyset_{d\_opt,j}^{Gyro\_Coil})]-[V_{Gyro\_Coil,j}^{Drift\_Derived}]\} \cong -0.5800$ mV 687. The first side of $\Delta V_j^{Derived}$ just above is $A_{1,j}\sin(\emptyset_{R,j}^{Gyro\_Coil}+\emptyset_{d\_opt,j}^{Gyro\_Coil})$ and was obtained from item 22.

26 The direction mentioned as yaw in items 20-26 means the parallel direction of the sensitive surface vector $A_{GC}$ 100 of "Gyro Coil" 101 to the direction of the angular rate of 9.83°/h west to east of Earth projected on the laboratory latitude as in FIG. 1.

It is noted that "Monitor Coil" 103 used to derive the instantaneous drift of the DDM-IFOG having "Gyro Coil" 101 is always settled perpendicular to the direction of any angular rate component influencing and/or projecting on the DDM-IFOG for which the patent is claimed, to obtain a zero SPS induced inside "Monitor Coil" 103 $\emptyset_{R,j}^{Monitor}=0$, and so $V_{Monitor\_Coil,j}(\emptyset_{R,j}^{Monitor})$ 585 is composed of $B_{1,j}\sin(\emptyset_{d\_opt,j}^{Monitor\_Coil})$ only, which can be correlated with the instantaneous zero rotation rate voltage of the demodulation circuit 226 of the DDM-IFOG with "Gyro Coil" 101 $V_{Gyro\_Coil,j}^{Drift}=A_{1,j}\sin(\emptyset_{d\_opt,j}^{Gyro\_Coil})$ 480 together with electrical scale factor $A_{1,j}$. The method and the DDM-IFOG configuration containing MEMS FO ON/OFF switches 206, 208 are valid and useful for monitoring and deriving the instantaneous zero rotation rate voltage of the demodulation circuit 226 of the DDM-IFOG with "Gyro Coil" 101 under continuous yaw rotation (z-axis) provided that the rotations around x-axis (pitch rotation) and y-axis (roll rotation) are prohibited by considering the rotation around x-axis causes the transformation of y-axis↔z-axis, the rotation around y-axis causes the transformation of x-axis↔z-axis, and finally the rotation around z-axis causes the transformation of y-axis↔x-axis from the rotation matrices.

All the numerical values, belonging to the DDM-IFOG characteristics, the orientation angles of the sensing coils 101,103 with respect to the laboratory latitude where the DDM-IFOG and the method invented is placed, the rotation induced-electrical output voltages of the DDM-IFOG, the timings and the signalizations 360,660 generated by the Software_1 and the Software_2, the laboratory latitude, optical power of SLED 228, injected optical power into the sensing coils 101,103, the amplitude and the frequency applied to the phase modulator (PZT 220), the lengths of the sensing coils, called "Gyro Coil" 101 and "Monitor Coil" 103 herein, are preferred embodiments. Therefore, the main frame of the detailed explanations given in this text belonging to this invention disclosure describes the DDM-IFOG configuration newly designed and the method acting with the DDM-IFOG configuration. As a result, the small and/or big changes on few or all of numerical values belonging to the DDM-IFOG configuration and the method given in this invention don't mean the change of this invention.

Areas of Use of the DDM-IFOG Invented

1-) One of the most important areas of use of the DDM-IFOG configuration together with the method associated with the software_1 and the software_2 described in this invention is the precise IFOG calibrations to be carried out by coinciding pitch-yaw axes of the relevant IFOG's sensing coils with the pitch-yaw axes of a 3D-angular rate simulator and Earth rotation axis (yaw) during the calibration along with using proper switching mechanisms described herein. Especially, during the determination of Scale Factor ($SF_{open}$ or $SF_{closed}$) of the DDM-IFOG, the sensitive surface vector ($A_{GC}$ 100) of which is coincided with $\Omega_{Earth}$ 712 as parallel, described as in the Second Part of Flow Diagram of the Second Measurement, the instantaneous drift of "Gyro Coil" 101 together with the variation of electrical scale factor $A_{1,j}$, which shows the instantaneous zero rotation voltage of the DDM-IFOG detecting yaw rotation continuously, is monitored and derived in real time without orienting $A_{GC}$ 100 perpendicular to $\Omega_{Earth}$ 712. There is no necessity of re-orienting $A_{GC}$ 100 perpendicular to $\Omega_{Earth}$ 712 to measure and determine the real instantaneous zero rotation voltage of the demodulation circuit 226 of the DDM-IFOG in this invention. The method detailed in items 10 to 19 of The Second Part of the Second Measurement Series and the IFOG configuration in this invention are used in the precise and accurate determination of scale factor (SF) of the DDM-IFOG because instantaneous drift corresponding to zero rotation rate voltage at any time is being monitored, and derived without repetitive orientation of "Gyro Coil" 101 perpendicularly with respect to Earth rotation axis.

2-) The other important area of use of the DDM-IFOG configuration together with the method associated with the software_1 and the software_2 described in this invention is to find the true north (geographic north). The method detailed in items 20 to 26 of The Second Part of the Second Measurement Series and the DM-IFOG configuration in this invention are used in the precise and accurate finding true north by means of the IFOG and the method introduced in the invention. When the DDM-IFOG is on North Pole, the maximum rotation of 15.041°/h west to east undergoes "Gyro Coil" 101 and "Monitor Coil" 103 generates zero SPS.

In this orientation of both of the sensing coils 101,103, $\Delta V_j^{Derived}=\{[A_{1,j}\sin(\emptyset_{R,j}^{Gyro\_Coil}+\emptyset_{d\_opt,j}^{Gyro\_Coil})]-[V_{Gyro\_Coil,j}^{Drift\_Derived}]\}$ gives us around -0.9000 mV 900. On Equator line, the sensitive surface vectors $A_{GC}$ 100, $A_{MC}$ 105 of the sensing coils 101,103 are perpendicular to the Earth axis due to properties of the placement of "Gyro Coil" 101 and "Monitor Coil" 103 implemented as yaw and pitch in the invention and $\Delta V_j^{Derived} \cong 0$ 900. Finally, on South Pole, the DDM-IFOG in the invention generates $\Delta V_j^{Derived} \cong 0.9000$ mV 900.

Dynamic tracking (tracking in real time) of the instantaneous zero rotation rate voltage of the DDM-IFOG with "Gyro Coil" 101 by intervening "Monitor Coil" 103 for a 120 ms according to the method and the DDM-IFOG configuration presented in this invention provides a great advantage. If the drift of any conventional IFOG surpasses 15.041°/h as long as a moving platform carrying the conventional IFOG moves from north to south or vice versa, it is impossible to detect the voltage change on the projection of Earth angular rate depending on the latitude, where the moving platform moves, by a conventional IFOG. However, even if the output of an IFOG drifts as 15.041°/h over long term, due to the fact that the DDM-IFOG and the method developed in this invention give us to determine the instantaneous zero rotation voltage, the voltage difference stated as $\Delta V_j^{Derived}$ poles of Earth can instantaneously be obtained. This point is one of the vital and the most important throughputs of this invention. In the scope of this item, it is stated that the other area of use of this invention is the process of plane heading.

Moreover, items 1 and 2 in Areas of Use of the Invention are achieved by "Gyro Coil" 101 and "Monitor Coil" 103 which were wound with the style of standard telecommunication optical fiber. This gives rise to reduce the cost of the DDM-IFOG considerably. Furthermore, the reduction of the drift to ~1.20 (°/h) calculated through $\Delta V_j^{Derived}$ 900 from the drift of 3.72°/h calculated through $V_{Gyro\_Coil,j}$ ($\theta_{R,j}^{Gyro\_Coil}$) 480 according to Allan Variance method is accomplished without μ-metal protection, causing an additional relieve in the cost, and the weight of the DDM-IFOG.

3-) The method and the DDM-IFOG configuration described in the invention is valid for not only the IFOG having the drift of a few (°/h) mentioned in the above procedures but also the IFOG having the drift smaller and larger than a few (°/h) provided that the procedures described above are correctly applied.

4-) For IFOGs which have detection level not capable to sensing the angular rates as low as Earth Rotation rate of 15.041 (°/h), the method and the DDM-IFOG configuration, which are introduced in this invention, can be used without coinciding of the yaw axis of both of the sensitive surface vectors $A_{GC}$ 100 of the DDM-IFOG and the axis of Earth Rotation ($\Omega_{Earth}$ 712) provided that the roll rotation of the DDM-IFOG is well characterized. Furthermore, provided that the necessary inclination of "Gyro Coil" 101 with respect to the latitude where the platform having the DDM-FOG is moving is made, warships, submarines, and any other type moving platforms having relatively low angular rate generators constitute the other areas of use by considering the projected angular rates on the new frames obtained from these rotation matrices.

5-) By using the DDM-IFOG configuration given in FIG. 2 and the proper switching signalization presented in this invention, the sensing coils settled on the perpendicular axes relative to one another, as Cartesian Coordinate axes, can sequentially, periodically, and/or freely switched by executer/implementer/software personnel, depending on the type of any application. With the switching procedure of the sensing coils, the optical power of SLED and finally driving current and cooling current of SLED can be reduced by evaluating the unused sensing coil or coils with help of the relevant software controlling the DDM-IFOG presented in this invention.

What is claimed is:

1. A Dynamical Drift Monitoring-Interferometric Fiber Optic Gyroscope (DDM-IFOG) system, comprising:
   an open loop interferometric fiber optic gyroscope (IFOG),
   a first single mode fiber optic sensing coil called "Gyro Coil", wherein the "Gyro Coil" has a loop transit time for light velocity, the "Gyro Coil" is used for detecting Sagnac Phase Shift induced by yaw rotation rate, and a sensitive surface vector of the "Gyro Coil" is predefined as yaw axis of rotation to be applied,
   a second single mode sensing coil called "Monitor Coil", wherein the "Monitor Coil" has a different loop transit time from the loop transit time of said "Gyro Coil", the "Monitor Coil" is used for monitoring and deriving an instantaneous zero rotation voltage of the open loop IFOG with said "Gyro Coil" detecting yaw rotation rate under the influence of uniformly applied yaw rotation, the "Monitor Coil" is located perpendicular to said sensitive surface vector of said "Gyro Coil", and a sensitive surface vector of the "Monitor Coil" is predefined as pitch axis,
   a superluminescent light emitting diode (SLED) emitting light wave having suitable wavelength for single mode propagation,
   a photodiode used to convert optical power into photocurrent,
   a demodulation circuit generating an analog voltage when either said "Gyro Coil" or said "Monitor Coil" is connected to said open loop IFOG intermittently,
   a 45 dB fiber optic (FO) polarizer having an input port and an output port, wherein the 45 dB FO polarizer operates bi-directionally, creating secondary polarized light waves,
   a signal generator generating a resonant frequency $\omega_m$ and a modulation voltage amplitude ($V_{mod}^{p-p}$),
   a light intensity stabilization circuit,
   a first 2×2 fiber optic (FO) splitter/coupler, wherein the first 2×2 FO splitter/coupler has two input arms and two output arms, one input arm is linked to a light output of said SLED by a fusion splice, the other input arm of the first 2×2 FO splitter/coupler is connected to said photodiode by a fusion splice, one output arm of the first 2×2 FO splitter/coupler is connected to said input port of said 45 dB FO polarizer by a fusion splice, the other output arm of the first 2×2 FO splitter/coupler is combined to said light intensity stabilization circuit by a fusion splice, the first 2×2 FO splitter/coupler supports single mode regime of electromagnetic fields of light waves emerging from said SLED, the first 2×2 FO splitter/coupler is used for equally splitting said light waves emerging from said SLED into two equal intensities and for coupling light waves coming from said "Gyro Coil" and said "Monitor Coil" through a cross pass between said output arm connected to said input port and said input arm connected to said photodiode,
   a microcontroller card, wherein a flash memory of the microcontroller card is loaded with software including a first software and a second software, a first pinout and a second pinout of the microcontroller card are used for obtaining logic 1 and logic 0 levels by means of said software periodically and successively, and the microcontroller card has an analog digital converter (ADC) controlled by said software and controlled by said two pinouts synchronously, a first microelectromechanical structure (MEMS) fiber optic (FO) ON/OFF switch, wherein the first MEMS FO ON/OFF switch has two optical arms and one electrical control pin, the first MEMS FO ON/OFF switch has bidirectional behavior, one optical arm of the first MEMS FO ON/OFF switch is fusion spliced to said "Gyro Coil", the other optical arm of the first MEMS FO ON/OFF switch is fusion spliced to one output arm of a second 1×2 single mode fiber optic splitter/coupler, said electrical control pin of the first MEMS FO ON/OFF switch is connected to said first pinout of said microcontroller card, the first MEMS FO ON/OFF switch is used to keep said "Gyro Coil" in the open loop IFOG when the electrical control pin of said first MEMS FO ON/OFF switch is set to be 5V keep said "Gyro Coil" out the open loop IFOG when the electrical control pin of said first MEMS FO ON/OFF switch is set to be 0V for a time interval specified by said software, a second microelectromechanical structure (MEMS) fiber optic (FO) ON/OFF switch, wherein the second MEMS FO ON/OFF switch has two optical arms and one electrical control pin, the second MEMS FO ON/OFF switch has bidirectional behavior, one optical arm of the second MEMS FO ON/OFF switch is fusion spliced to said "Monitor Coil", the other optical arm of the second MEMS FO ON/OFF switch is fusion spliced to an output arm of the second 1×2 single mode fiber optic splitter/coupler, said electrical control pin of the second MEMS FO ON/OFF switch is connected to said microcontroller card's second pinout, the second MEMS FO ON/OFF switch is used to keep said "Monitor Coil" in the open loop IFOG when the electrical control pin of the second MEMS FO ON/OFF switches is set to 5V and keep said "Monitor Coil" out the open loop IFOG when the electrical control pin of the second MEMS FO ON/OFF switches is set to 0V for a time interval specified by said software, a first 1×2 single mode fiber optic splitter/coupler, wherein the first 1×2 single mode fiber optic splitter/coupler has a bidirectional behavior, one input arm and two output arms, one output arm of the first 1×2 single mode fiber optic splitter/coupler is attached to said "Gyro Coil" by a fusion splice, and the other output arm of the first 1×2 single mode fiber optic splitter/coupler is attached to said "Monitor Coil" by a fusion splice, the second 1×2 single mode fiber optic splitter/coupler, wherein the second 1×2 single mode fiber optic splitter/coupler has a bidirectional behavior, one input arm and two output arms, one output arm of the second 1×2 single mode fiber optic splitter/coupler is attached to said first MEMS FO ON/OFF switch by a fusion splice, and the other output arm of the second 1×2 single mode fiber optic splitter/coupler is attached to said second MEMS FO ON/OFF switch by a fusion splice, a second 2×2 single mode splitter/coupler, wherein the second 2×2 single mode splitter/coupler has four arms, including a first arm, a second arm, a third arm, and a fourth arm operating as bidirectional optical paths for clockwise and counter clockwise propagation of said secondary polarized light waves launching into said "Gyro Coil" and said "Monitor Coil" and returning from said "Gyro Coil" and said "Monitor Coil", the first arm of the second 2×2 single mode splitter/coupler is connected to the output port of said 45 dB FO polarizer via a fusion splice, the second arm of the second 2×2 single mode splitter/coupler is tightly twisted for preventing air/glass Fresnel reflections, the third arm of the second 2×2 single mode splitter/coupler is attached to the input arm of said first 1×2 single mode fiber optic splitter/coupler by a fusion splice, the fourth arm of the second 2×2 single mode splitter/coupler is attached to the input arm of said second 1×2 single mode fiber optic splitter/coupler by a fusion splice, for clockwise propagation of said secondary polarized light waves launching into said "Gyro Coil" and into said "Monitor Coil" and returning from said "Gyro Coil" and said "Monitor Coil", for counter clockwise propagation of said secondary polarized light waves launching into said "Gyro Coil" and into said "Monitor Coil" and returning from said "Gyro Coil" and said "Monitor Coil", by equally splitting said secondary polarized light waves emerging from said 45 dB FO polarizer, in order to construct an enclosed and reciprocal interferometric optical path made of both said "Gyro Coil" and said "Monitor Coil" and to couple said secondary polarized light waves returned from said "Gyro Coil" and said "Monitor Coil", in the second 2×2 single mode splitter/coupler said secondary polarized light waves propagate in clockwise and counter clockwise directions, and in middle positions of the second 2×2 single mode splitter/coupler said secondary polarized light waves, divided into two by said first 1×2 single mode fiber optic splitter/coupler and said second 1×2 single mode fiber optic splitter/coupler, propagating in clockwise and counter clockwise, form interference fringes, a piezoelectric transducer (PZT), wherein on the PZT a few turns of an optical fiber section of said fourth arm of said second 2×2 single mode splitter/coupler is driven electronically, and the PZT is used to create a phase modulation with elasto-optic property of optical fiber by stretching said optical fiber section of said fourth arm, fusion splices, wherein the fusion splices are used to combine single mode optical fiber of said SLED with one input arm of said first 2×2 FO splitter/coupler, to combine single mode optical fiber of said photodiode with said another input arm of said first 2×2 FO splitter/coupler, to combine said one output arm of said first 2×2 FO splitter/coupler with said input port of said 45 dB FO polarizer, to combine said the other output arm of said first 2×2 FO splitter/coupler with single mode optical fiber of said light intensity stabilization circuit, to combine said output port of said 45 dB FO polarizer with said first arm of said second 2×2 single mode splitter/coupler, to combine said third arm of said second 2×2 single mode splitter/coupler with said one input arm of said first 1×2 single mode fiber optic splitter/coupler, to combine one output arm of said first 1×2 single mode fiber optic splitter/coupler with one end of said "Gyro Coil", to combine said the other output arm of one end of said first 1×2 single mode fiber optic splitter/coupler with one end of said "Monitor Coil", to combine said another end of said "Gyro Coil" with said optical arm of said first MEMS FO ON/OFF switch, to combine said another end of said "Monitor Coil" with said one optical arm of said second MEMS FO ON/OFF switch to combine said the other optical arm of said first MEMS FO ON/OFF switch with one output arm of said second 1×2 single mode fiber optic splitter/coupler, to combine said the other optical arm of said second MEMS FO ON/OFF switch with said the other output arm of said second 1×2 single mode fiber optic splitter/coupler, to combine said one input arm of said second 1×2 single mode fiber optic splitter/coupler with said fourth arm of said second 2×2 single mode splitter/coupler.

2. The DDM-IFOG system of claim 1, wherein said first 1×2 single mode fiber optic splitter/coupler equally divides said secondary polarized light waves coming from said Arm_3 of said 2×2 single mode splitter/coupler.

3. The DDM-IFOG system of claim 2, wherein said secondary polarized light waves equally divided by said first 1×2 single mode fiber optic splitter/coupler are launched into said one end of said "Gyro Coil" and into said one end of said "Monitor Coil" through said fusion splices.

4. The DDM-IFOG system of claim 3, wherein said secondary polarized light waves launched into said "Gyro Coil" and into "Monitor Coil" are not phase modulated.

5. The DDM-IFOG system of claim 1, wherein said second 1×2 single mode fiber optic splitter/coupler equally divides said secondary polarized light waves coming from said fourth arm of said 2×2 single mode splitter/coupler.

6. The DDM-IFOG system of claim 5, wherein secondary polarized light waves equally divided by said second 1×2 single mode fiber optic splitter/coupler are launched into said first MEMS FO ON/OFF switch and into said second MEMS FO ON/OFF switch through said fusion splices.

7. The DDM-IFOG system of claim 6, wherein said secondary polarized light waves, launched into said "Gyro Coil" and into "Monitor Coil", are commonly phase-modulated applied by said PZT driven by said signal generator, generating said resonant frequency compatible with said transit time of said "Gyro Coil" and said modulation voltage amplitude.

8. The DDM-IFOG system of claim 7, wherein said fourth arm of said second 2×2 single mode splitter/coupler_2 is attached to said one input arm of said second 1×2 single mode fiber optic splitter/coupler_2 by said fusion splices, one to ten turns of said fourth arm are wrapped on said PZT, said fourth arm stretches common optical paths of said "Gyro Coil" and said "Monitor Coil" at said resonant frequency with said modulation voltage amplitude for creating common phase modulated light wave inside said "Gyro Coil" and said "Monitor Coil" synchronously, said fourth arm is periodically and electrically driven by said signal generator.

9. The DDM-IFOG system of claim 6, wherein the first MEMS FO ON/OFF switch and the second MEMS FO ON/OFF switch are in said transparent condition at 5V of electrical control pins, meaning logic 1, and are electrically controlled via said software of said microcontroller card.

10. The DDM-IFOG system of claim 9, wherein said first MEMS FO ON/OFF switch and the second MEMS FO ON/OFF switch are electrically controlled by said software loaded into the flash memory of said microcontroller, wherein said secondary polarized light waves, travelling in counter propagating form inside said "Gyro Coil" and inside said "Monitor Coil" and forming said interference fringes, are allowed for bidirectional propagation inside said first MEMS FO ON/OFF switch and said second MEMS FO ON/OFF switch, wherein said interfering light waves, coming from said "Gyro Coil" and said "Monitor Coil" through said first MEMS FO ON/OFF switch and said second MEMS FO ON/OFF switch and falling onto said photodiode, stimulate said photocurrent in said photodiode.

11. A method of monitoring and deriving instantaneous zero rotation voltage of a Dynamical Drift Monitoring-Interferometric Fiber Optic Gyroscope (DDM-IFOG) system wherein the DDM-IFOG system comprises:

an open loop interferometric fiber optic gyroscope (IFOG), a first single mode fiber optic sensing coil called "Gyro Coil", wherein the "Gyro Coil" has a loop transit time for light velocity, the "Gyro Coil" is used for detecting Sagnac Phase Shift induced by yaw rotation rate, and a sensitive surface vector of the "Gyro Coil" is predefined as yaw axis of rotation to be applied, a second single mode sensing coil called "Monitor Coil", wherein the "Monitor Coil" has a different loop transit time from the loop transit time of said "Gyro Coil", the "Monitor Coil" is used for monitoring and deriving an instantaneous zero rotation voltage of the open loop IFOG with said "Gyro Coil" detecting yaw rotation rate under the influence of uniformly applied yaw rotation, the "Monitor Coil" is located perpendicular to said sensitive surface vector of said "Gyro Coil", and a sensitive surface vector of the "Monitor Coil" is predefined as pitch axis, a superluminescent light emitting diode (SLED) emitting light wave having suitable wavelength for single mode propagation, a photodiode used to convert optical power into photocurrent, a demodulation circuit generating analog voltage when either said "Gyro Coil" or said "Monitor Coil" is connected to said open loop IFOG intermittently, a 45 dB fiber optic (FO) polarizer having an input port and an output port, wherein the 45 dB FO polarizer operates bi-directionally, creating secondary polarized light waves, a signal generator generating a resonant frequency $\omega_m$ and a modulation voltage amplitude ($V_{mod}^{p-p}$), a light intensity stabilization circuit, a first 2×2 fiber optic (FO) splitter/coupler, wherein the first 2×2 FO splitter/coupler has two input arms and two output arms, one input arm is linked to a light output of said SLED by a fusion splice, the other input arm of the first 2×2 FO splitter/coupler is connected to said photodiode by a fusion splice, one output arm of the first 2×2 FO splitter/coupler is connected to said input port of said 45 dB FO polarizer by a fusion splice, the other output arm of the first 2×2 FO splitter/coupler is combined to said light intensity stabilization circuit by a fusion splice, the first 2×2 FO splitter/coupler supports single mode regime of electromagnetic fields of light waves emerging from said SLED, the first 2×2 FO splitter/coupler is used for equally splitting said light waves emerging from said SLED into two equal intensities and for coupling light waves coming from said "Gyro Coil" and said "Monitor Coil" through a cross pass between said output arm connected to said input port and said input arm connected to said photodiode, a microcontroller card, wherein a flash memory of the microcontroller card is loaded with software including a first software and a second software, a first pinout and a second pinout of the microcontroller card are used for obtaining logic 1 and logic 0 levels by means of said software periodically and successively, and the microcontroller card has an analog digital converter (ADC) controlled by said software and controlled by said two pinouts synchronously, a first microelectromechanical structure (MEMS) fiber optic (FO) ON/OFF switch, wherein the first MEMS FO ON/OFF switch has two optical arms and one electrical control pin, the first MEMS FO ON/OFF switch has bidirectional behavior, one optical arm of the first MEMS FO ON/OFF switch is fusion spliced to said "Gyro Coil", the other optical arm of the first MEMS FO ON/OFF switch is fusion spliced to one output arm of a second 1×2 single mode fiber optic splitter/coupler, said electrical control pin of the first MEMS FO ON/OFF switch is connected to said first pinout of said microcontroller card, the first MEMS FO ON/OFF switch is used to keep said "Gyro Coil" in the open loop IFOG when the electrical control pin of the first MEMS FO ON/OFF switches is set to 5V and keep said "Gyro Coil" out the open loop IFOG when the electrical control pin of the first MEMS FO ON/OFF switches is set to 0V for a time interval specified by said software, a second microelectromechanical structure (MEMS) fiber optic (FO) ON/OFF switch, wherein the second MEMS FO ON/OFF switch has two optical arms and one electrical control pin, the second MEMS FO ON/OFF switch has bidirectional behavior, one optical arm of the second MEMS FO ON/OFF switch is fusion spliced to said "Monitor Coil", the other optical arm of the second MEMS FO ON/OFF switch is fusion spliced to an output arm of the second 1×2 single mode fiber optic splitter/coupler, said electrical control pin of the second MEMS FO ON/OFF switch is connected to said microcontroller card's second pinout, the second MEMS FO ON/OFF switch is used to keep said "Monitor Coil" in the open loop IFOG when the electrical control pin of the second MEMS FO ON/OFF switches is set to 5V and keep said "Monitor Coil" out the open loop IFOG when the electrical control pin of the second MEMS FO ON/OFF switches is set to 0V for a time interval specified by said software, a first 1×2 single mode fiber optic splitter/coupler, wherein the first 1×2 single mode fiber optic splitter/coupler has a bidirectional behavior, one input arm and two output arms, one output arm of the first 1×2 single mode fiber optic splitter/coupler is attached to said "Gyro Coil" by a fusion splice, and the other output arm of the first 1×2 single mode fiber optic splitter/coupler is attached to said "Monitor Coil" by a fusion splice, the second 1×2 single mode fiber optic splitter/coupler, wherein the second 1×2 single mode fiber optic splitter/coupler has a bidirectional behavior, one input arm and two output arms, one output arm of the second 1×2 single mode fiber optic splitter/coupler is attached to said first MEMS FO ON/OFF switch by a fusion splice, and the other output arm of the second 1×2 single mode fiber optic splitter/coupler is attached to said second MEMS FO ON/OFF switch by a fusion splice, a second 2×2 single mode splitter/coupler, wherein the second 2×2 single mode splitter/coupler has four arms, including a first arm, a second arm, a third arm, and a fourth arm operating as bidirectional optical paths for clockwise and counter clockwise propagation of said secondary polarized light waves launching into said "Gyro Coil" and said "Monitor Coil" and returning from said "Gyro Coil" and said "Monitor Coil", the first arm of the second 2×2 single mode splitter/coupler is connected to the output port of said 45 dB FO polarizer via a fusion splice, the second arm of the second 2×2 single mode splitter/coupler is tightly twisted for preventing air/glass Fresnel reflections, the third arm of the second 2×2 single mode splitter/coupler is attached to the input arm of said first 1×2 single mode fiber optic splitter/coupler by a fusion splice, the fourth arm of the second 2×2 single mode splitter/coupler is attached to the input arm of said second 1×2 single mode fiber optic splitter/coupler by a fusion splice, for clockwise propagation of said secondary polarized light waves launching into said "Gyro Coil" and into said "Monitor Coil" and returning from said "Gyro Coil" and said "Monitor Coil", for counter clockwise propagation of said secondary polarized light waves launching into said "Gyro Coil" and into said "Monitor Coil" and returning from said "Gyro Coil" and said "Monitor Coil", by equally splitting said secondary polarized light waves emerging from said 45 dB FO polarizer, in order to construct an enclosed and reciprocal interferometric optical path made of both said "Gyro Coil" and said "Monitor Coil" and to couple said secondary polarized light waves returned from said "Gyro Coil" and said "Monitor Coil", in the second 2×2 single mode splitter/coupler said secondary polarized light waves propagate in clockwise and counter clockwise directions, and in middle positions of the second 2×2 single mode splitter/coupler said secondary polarized light waves, divided into two by said first 1×2 single mode fiber optic splitter/coupler and said second 1×2 single mode fiber optic splitter/coupler, propagating in clockwise and counter clockwise, form interference fringes, a piezoelectric transducer (PZT), wherein on the PZT a few turns of an optical fiber section of said fourth arm of said second 2×2 single mode splitter/coupler is driven electronically, and the PZT is used to create a phase modulation with elasto-optic property of optical fiber by stretching said optical fiber section of said fourth arm, fusion splices, wherein the fusion splices are used to combine single mode optical fiber of said SLED with one input arm of said first 2×2 FO splitter/coupler, to combine single mode optical fiber of said photodiode with said another input arm of said first 2×2 FO splitter/coupler, to combine said one output arm of said first 2×2 FO splitter/coupler with said input port of said 45 dB FO polarizer, to combine said the other output arm of said first 2×2 FO splitter/coupler with single mode optical fiber of said light intensity stabilization circuit, to combine said output port of said 45 dB FO polarizer with said first arm of said second 2×2 single mode splitter/coupler, to combine said third arm of said second 2×2 single mode splitter/coupler with said one input arm of said first 1×2 single mode fiber optic splitter/coupler, to combine one output arm of said first 1×2 single mode fiber optic splitter/coupler with one end of said "Gyro Coil", to combine said the other output arm of one end of said first 1×2 single mode fiber optic splitter/coupler with one end of said "Monitor Coil", to combine said another end of said "Gyro Coil" with said optical arm of said first MEMS FO ON/OFF switch, to combine said another end of said "Monitor Coil" with said one optical arm of said second MEMS FO ON/OFF switch to combine said the other optical arm of said first MEMS FO ON/OFF switch with one output arm of said second 1×2 single mode fiber optic splitter/coupler, to combine said the other optical arm of said second MEMS FO ON/OFF switch with said the other output arm of said second 1×2 single mode fiber optic splitter/coupler, to combine said one input arm of said second 1×2 single mode fiber optic splitter/coupler with said fourth arm of said second 2×2 single mode splitter/coupler, wherein the method comprising the following steps:

for clockwise (CW)/counter clockwise (CCW) propagation of secondary polarized light waves in said "Gyro Coil" and in said "Monitor Coil", splitting said secondary polarized light waves propagating in said third arm of said second 2×2 single mode splitter/coupler through the second 2×2 single mode splitter/coupler into two parts, launching one part of said secondary polarized light waves divided by said second 2×2 single mode splitter/coupler, wherein said one part of said secondary polarized light waves propagates in said third arm of said second 2×2 single mode splitter/coupler, into said one input of said first 1×2 single mode fiber optic splitter/coupler without phase modulation, additionally splitting said one part of said secondary polarized light waves launched into said one input of said first 1×2 single mode fiber optic splitter/coupler, injecting said additionally split portion of said one part of said secondary polarized light waves divided by said first 1×2 single mode fiber optic splitter/coupler, into said one end of said "Gyro Coil", injecting said additionally split portion of said one part of said secondary polarized light waves divided by said first 1×2 single mode fiber optic splitter/coupler, into said one end of said "Monitor Coil", launching said additionally split portion of said one part of said secondary polarized light waves that completes propagation along said "Gyro Coil", wherein said additionally split portion of said one part of said secondary polarized light waves that completes propagation along said "Gyro Coil" comes from "Gyro Coil", into a first MEMS FO ON/OFF switch through said fusion splice, launching said additionally split portion of said one part of said secondary polarized light waves that completes propagation along said "Monitor Coil", wherein said additionally split portion of said one part of said secondary polarized light waves that completes propagation along said "Monitor Coil" comes from "Monitor Coil", into a second MEMS FO ON/OFF switch through fusion splice, launching a first light wave that completes propagation along said "Gyro Coil", wherein the first light wave comes from said first MEMS FO ON/OFF switch into said one output arm of said second 1×2 single mode fiber optic splitter/coupler, launching a second light wave that completes propagation along said "Monitor Coil", wherein the second light wave comes from said first MEMS FO ON/OFF switch into said the other output arm of said second 1×2 single mode fiber optic splitter/coupler, coupling said second light wave coming from said second MEMS FO ON/OFF switch with said first light wave coming from said first MEMS FO ON/OFF switch by the second 1×2 single mode fiber optic splitter/coupler at said one input arm of said second 1×2 single mode fiber optic splitter/coupler, launching both of said coupled second light wave and said first light wave into said fourth arm of said second 2×2 single mode splitter/coupler through said fusion splice, for counter clockwise (CCW)/clockwise (CW) propagation of secondary polarized light waves in said "Gyro Coil" and in said "Monitor Coil", splitting said secondary polarized light waves propagating in said fourth arm of said second 2×2 single mode splitter/coupler through a second 2×2 single mode splitter/coupler into two parts, launching said one part of said secondary polarized light wave divided by said second 2×2 single mode splitter/coupler, wherein said one part of said secondary polarized light waves propagates in said fourth arm of said second 2×2 single mode splitter/coupler, into said one input of said second 1×2 single mode fiber optic splitter/coupler with phase modulation, additionally splitting said one part of said secondary polarized light wave launched into said one input of said second 1×2 single mode fiber optic splitter/coupler, launching said additionally split portion of said one part of said secondary polarized light waves into said first MEMS FO ON/OFF switch through fusion splice, launching said additionally split portion of said one part of said secondary polarized light waves into said second MEMS FO ON/OFF switch through fusion splice, injecting a third light wave coming from said first MEMS FO ON/OFF switch into said on end of said "Gyro Coil", injecting a fourth light wave coming from said first MEMS FO ON/OFF switch into said on end of said "Monitor Coil", launching said third light wave that completes propagation along said "Gyro Coil", into said one output arm of said first 1×2 single mode fiber optic splitter/coupler through fusion splice, launching said fourth light wave that completes propagation along said "Monitor Coil" into said the other output arm of said first 1×2 single mode fiber optic splitter/coupler through said fusion splice, coupling said third light wave with said fourth light wave by said first 1×2 single mode fiber optic splitter/coupler at said one input arm of said first 1×2 single mode fiber optic splitter/coupler, launching said coupled light waves into said third arm of said second 2×2 single mode splitter/coupler through fusion splice, completion of a closed and reciprocal optical path of said open loop IFOG for CW and CCW propagation inside said "Gyro Coil" and said "Monitor Coil", controlling a series of timing and signalization processes of said second MEMS FO ON/OFF switch and said first MEMS FO ON/OFF switch by said microcontroller card, in the series of timing and signalization processes said loop transit time of said "Gyro Coil" and said loop transit time of said "Monitor Coil", a time constant of said demodulation circuit, settling and sampling time of said ADC, a machine cycle time of said microcontroller card together with a total timing of said software, and the response time of a phase zeroing circuit to be used to keep a total phase inside "Gyro Coil" be zero for closed loop configuration, are taken into account, loading said first software and said second software into said flash memory of said microcontroller card, converting said analog voltage generated by said demodulation circuit into digital codes by means of said ADC with said software loaded on said flash memory under yaw rotation rate influence of said open loop IFOG, transforming said digital codes into voltage information corresponding to yaw rotation rate information sensed by said "Gyro Coil" by using a scale factor of said open loop IFOG when said "Gyro Coil" under uniform influence of yaw rotation of direction is in said open loop IFOG through said first MEMS FO ON/OFF switch for a first period and said "Monitor Coil" under influence of yaw rotation of direction is out by said open loop IFOG through said first MEMS FO ON/OFF switch for said first period by using said second software, transforming said digital codes into voltage information corresponding to instantaneous zero rotation rate voltage of said "Gyro Coil", when said "Gyro Coil" under uniform influence of yaw rotation of direction is out by said open loop IFOG through said first MEMS FO ON/OFF switch for a second period and said "Monitor Coil" under influence of yaw rotation of direction is in said open loop IFOG through said first MEMS FO ON/OFF switch for said second period by using said second software.

12. The method of claim 11, wherein said first software controls said MEMS FO ON/OFF switch and said MEMS FO ON/OFF switch and generates a first signalization, in the first signalization "Gyro Coil" is connected to the open loop IFOG through said first MEMS FO ON/OFF switch_1, corresponding to a state of "Gyro Coil" IN, and "Monitor Coil" is disconnected from the open loop IFOG through said second MEMS FO ON/OFF switch, corresponding to said state of "Monitor Coil" OUT for a first time interval, in the first signalization "Gyro Coil" is disconnected from the open loop IFOG through said first MEMS FO ON/OFF switch, corresponding to a state of "Gyro Coil" OUT, and "Monitor Coil" is connected to the open loop IFOG through said second MEMS FO ON/OFF switch, corresponding to a state of "Monitor Coil" IN for a second time interval equal to said first time interval, enabling said analog to digital converter of said microcontroller card to sample output of said demodulation circuit at said state of "Gyro Coil" IN and at said state of "Monitor Coil" IN in turn during said first signalization, in order to calculate an averaged γ-correlation-coefficient between both rotation voltage of said demodulation circuit of the open loop IFOG with the "Gyro Coil" placed perpendicular to Earth rotation axis and zero rotation voltage of the open loop IFOG with said "Monitor Coil" placed perpendicular to both of the axis of said Earth rotation and an axis of said "Gyro Coil", when said "Gyro Coil" and said "Monitor Coil" are in turn attached to said open loop IFOG through said MEMS FO ON/OFF switch_1 and said MEMS FO ON/OFF switch_2.

13. The method of claim 11, wherein said second software, said averaged γ-correlation-coefficient and an offset voltage of zero as an initial value to start iteration are entered, said second software controls said first MEMS FO ON/OFF switch and said second MEMS FO ON/OFF switch and generates a second signalization, in the second signalization the "Gyro Coil" is connected to the open loop IFOG through said first MEMS FO ON/OFF switch, corresponding to a state of "Gyro Coil" IN and the "Monitor Coil" is disconnected from the open loop IFOG through said second MEMS FO ON/OFF switch, corresponding to a state of "Monitor Coil" OUT for a third time interval, in the second signalization the "Gyro Coil" is disconnected from the open loop IFOG through said first MEMS FO ON/OFF switch, corresponding to a state of "Gyro Coil" OUT and the "Monitor Coil" is connected to the open loop IFOG through said second MEMS FO ON/OFF switch, corresponding to said state of "Monitor Coil" IN for a fourth time interval smaller than said third time interval in order to derive said instantaneous zero rotation voltage of the open loop IFOG with said "Gyro Coil", enabling said analog-to-digital converter of said microcontroller card to sample output of said demodulation circuit during said second signalization, in order to calculate an average offset voltage from said offset voltages, zero as said initial value was entered to start iteration, calculated from subtraction processes between a first output voltage obtained from said demodulation circuit when said "Gyro Coil", oriented perpendicular to Earth rotation axis, is connected to the open loop IFOG through said first MEMS FO ON/OFF switch and a second output voltage obtained from said demodulation circuit when said "Monitor Coil", perpendicularly oriented to both Earth rotation axis and said "Gyro Coil", is connected to the open loop IFOG through said second MEMS FO ON/OFF switch.

14. The method of claim 13, wherein said second software operates, in the second software said averaged offset voltage is entered as a new value, the second software is restarted by an operator, the second software samples a first output voltage of said demodulation circuit when said "Gyro Coil" is connected to said open loop IFOG and the second software calculates said instantaneous zero rotation voltage from a second output voltage of said demodulation circuit, sampled by said analog-to-digital converter (ADC) of said microcontroller card, by using the averaged γ-correlation-coefficient and the averaged offset voltage when said "Monitor Coil" is connected to said open loop IFOG, and finally the second software dynamically monitors and derives said instantaneous zero rotation rate voltage and corrected instantaneous voltage differences for orientations of said "Gyro Coil" and said "Monitor Coil" together with and rotation rate projections and external applications.

* * * * *